US012755088B1

(12) United States Patent
Chan

(10) Patent No.: US 12,755,088 B1
(45) Date of Patent: Oct. 6, 2026

(54) GENERATIVE DOCUMENT EDITING PIPELINES INFORMED BY CONTENT MANAGEMENT SYSTEM DATA

(71) Applicant: Dropbox, Inc., San Francisco, CA (US)

(72) Inventor: Richard Chan, Flushing, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/400,303

(22) Filed: Nov. 25, 2025

(51) Int. Cl.
*G06F 3/0482* (2013.01)
*G06F 3/0485* (2022.01)
*G06F 40/166* (2020.01)
*G06N 20/00* (2019.01)
*G06V 30/416* (2022.01)

(52) U.S. Cl.
CPC .......... *G06F 40/166* (2020.01); *G06F 3/0482* (2013.01); *G06F 3/0485* (2013.01); *G06N 20/00* (2019.01); *G06V 30/416* (2022.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 6,505,167 | B1 | 1/2003 | Horvitz et al. | |
| 6,553,358 | B1 * | 4/2003 | Horvitz | G06Q 10/107 706/45 |
| 9,495,481 | B2 * | 11/2016 | Brown | G16H 50/70 |
| 9,652,787 | B2 | 5/2017 | Churchill et al. | |
| 10,025,782 | B2 | 7/2018 | Massand | |
| 10,073,841 | B2 | 9/2018 | Churchill et al. | |
| 10,650,104 | B2 | 5/2020 | Churchill et al. | |
| 10,671,795 | B2 | 6/2020 | Perrin et al. | |
| 12,106,041 | B1 * | 10/2024 | Coil | G06F 40/106 |
| 12,118,513 | B1 * | 10/2024 | Lu | G06F 9/451 |
| 2008/0105470 | A1 * | 5/2008 | Van De Ven | G06F 3/04847 178/18.01 |
| 2008/0133618 | A1 * | 6/2008 | Kawabe | G06F 40/197 707/999.203 |
| 2010/0030578 | A1 * | 2/2010 | Siddique | G06Q 20/12 705/26.1 |

(Continued)

FOREIGN PATENT DOCUMENTS

| | | | |
|---|---|---|---|
| EP | 1038631 | A2 | 9/2000 |
| EP | 1855227 | A2 | 11/2007 |
| EP | 3002389 | B1 | 3/2018 |

*Primary Examiner* — Daniel Rodriguez
(74) *Attorney, Agent, or Firm* — Keller Preece PLLC

(57) ABSTRACT

This disclosure describes systems that implement document editing pipelines to generate document modifications by utilizing a generative model to modify digital documents. The disclosed systems can generate and provide for display, via a client device, a generative document editor that includes document editing pipeline elements that correspond to document editing pipelines that are instantiable to modify composition attributes of digital documents, such as grammar attributes, tone attributes, to add quotes to the digital document, to generate a review simulation of the digital document, and/or to autonomously complete a digital document. Further, based on determining compositional attributes, the disclosed systems can generate and provide for display spectrum slider elements. The disclosed systems can generate document modifications based on receiving indications of interactions with the spectrum slider elements.

20 Claims, 13 Drawing Sheets

(56) References Cited

U.S. PATENT DOCUMENTS

| | | | | |
|---|---|---|---|---|
| 2010/0077330 | A1* | 3/2010 | Kaplan | G06F 3/0481 715/764 |
| 2011/0010612 | A1* | 1/2011 | Thorpe | G06F 16/957 718/100 |
| 2014/0218372 | A1* | 8/2014 | Missig | G06F 3/04883 345/173 |
| 2016/0103824 | A1* | 4/2016 | Zupancic | G06F 40/205 704/9 |
| 2020/0371647 | A1* | 11/2020 | Gerges | G06F 40/151 |
| 2020/0410730 | A1* | 12/2020 | Wilensky | G06T 11/60 |
| 2021/0011592 | A1* | 1/2021 | Liu | G06F 3/048 |
| 2022/0414320 | A1* | 12/2022 | Dolan | G06F 40/30 |
| 2023/0153546 | A1* | 5/2023 | Peleg | G06F 3/0482 704/9 |
| 2023/0205980 | A1* | 6/2023 | Brockett | G06F 40/166 715/229 |
| 2023/0385320 | A1* | 11/2023 | Cai | G06N 20/00 |
| 2024/0061999 | A1* | 2/2024 | Religa | G06F 40/253 |
| 2024/0354130 | A1* | 10/2024 | Cadoni | G06F 40/279 |
| 2024/0386038 | A1* | 11/2024 | Amershi | G06F 16/3329 |
| 2024/0386634 | A1* | 11/2024 | Brown | G06F 40/166 |
| 2025/0005263 | A1* | 1/2025 | Mansour | G06F 40/134 |
| 2025/0007870 | A1* | 1/2025 | Kim | G06F 16/2455 |
| 2025/0021739 | A1* | 1/2025 | Shin | G06F 40/103 |
| 2025/0088946 | A1* | 3/2025 | Grida Ben Yahya | H04L 41/16 |
| 2025/0157103 | A1* | 5/2025 | Inkpen | G06F 16/739 |
| 2025/0190693 | A1* | 6/2025 | Plotkin | G06F 40/186 |
| 2025/0265394 | A1* | 8/2025 | Subrahmanyam | G06F 30/00 |
| 2025/0298500 | A1* | 9/2025 | Horvitz | G06F 3/04817 |
| 2026/0003496 | A1* | 1/2026 | Prasad | G06F 3/04886 |

* cited by examiner

GENERATIVE DOCUMENT EDITING PIPELINES INFORMED BY CONTENT MANAGEMENT SYSTEM DATA

BACKGROUND

Advancements in computing devices and networking technology have given rise to a variety of innovations in cloud-based digital content storage, retrieval, and processing. For example, advancements in cloud-based infrastructures and distributed computing systems have provided access to creation and storage of vast amounts of digital content. Further, existing systems also broadly provide access to artificial intelligence models or other tools or computing systems that can access the digital content to accomplish a variety of tasks for user accounts. Indeed, existing systems can use artificial intelligence models, such as large language models (LLMs), to augment or otherwise modify digital documents. Despite these capabilities, existing systems suffer from a variety of technical deficiencies, especially those regarding operational flexibility, accuracy, and computational efficiency due to factors such as types and quantities of digital content systems store.

As just mentioned, conventional systems are often operationally inflexible due at least in part to constraints of managing large amounts of digital content. For the most part, conventional systems rely on broad, generic workflows to apply a fixed set of editing functions, such as spell check or grammar fixes applied from generalized rules, irrespective of content within the edited document or stored elsewhere in the system. Some systems have been developed that apply LLMs to fix spelling, grammar, and other syntactical characteristics of a document, but even these LLM-based systems function in a one-size-fits-all manner, relying on standard LLM functionality that is not tailored to, or informed by, specific content of requesting user accounts.

Further, due at least in part to their inflexible natures, conventional content management systems often generate inaccurate digital document augmentations. Indeed, the operational inflexibility of many conventional systems inherently constrains accuracy because many existing tools rely on either fixed heuristics or fixed model parameters to modify digital documents, which are applied uniformly across user accounts. Accordingly, because conventional systems often operate agnostic to user account content, these systems struggle to generate modifications that accurately reflect internal practices, policies, and/or preferences of overarching content storage systems.

Moreover, due at least in part to the inflexibilities and inaccuracies of conventional systems, many conventional systems are computationally inefficient. For example, conventional systems often repeat document modification processes, which can be computationally expensive, especially in the case of LLM-based editors. Indeed, because existing systems frequently make mistakes, they often spend additional resources undoing mistakes and fixing them by reapplying new modifications. On top of these inefficiencies, the process of applying, undoing, and redoing modifications in inaccurate systems requires excessive navigational inputs to ultimately generate a satisfactory modification. These excessive user interactions often consume excessive computational resources (e.g., such as processing power, bandwidth, and/or memory) that could otherwise be preserved with a more efficient system.

SUMMARY

Embodiments of the present disclosure provide benefits and/or solve one or more of the foregoing or other problems in the art with systems, non-transitory computer-readable media, and methods for applying generative modifications to digital documents. Indeed, the disclosed systems can generate and provide for display a generative document editor within a web browser (and/or within a standalone application) on a client device. Further, the disclosed systems can generate the generative document editor to include pre-configured document editing pipeline elements that correspond to pre-configured document editing pipelines. Beyond pre-configured pipelines, the disclosed systems can additionally instantiate a freeform document editing pipeline to perform customized workflows (e.g., based on determining an interaction with a chat interface of the generative document editor). Based on determining an indication of an interaction with a generative document editing pipeline (freeform or pre-configured), the disclosed systems can generate and/or provide a corresponding prompt to a generative model to carry out the document editing pipeline. Indeed, the disclosed systems can instantiate different document editing pipelines to generate different types of document modifications, such as grammar attributes, tone attributes, locating and adding quotes (with cited sources), and/or other elements specified in a freeform input. In some cases, the disclosed systems can further augment a generative model to perform additional pipelines, including simulating document review by a particular user account or group of user accounts and/or autocompleting a document.

To execute various pipelines, the disclosed systems can augment operations of the generative document editor by utilizing data from a content item repository. For example, the disclosed systems can access a content item repository to determine specific document modification preferences to augment generative workflows of the document editing pipelines. For example, the disclosed systems can determine document modification preferences that are specific to a user account, specific to a group of user accounts, and/or that are specific to policies and/or preferences of a content management system.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

This disclosure describes one or more embodiments of a generative text editing system that utilizes a generative document editor to implement document editing pipelines and generate different types of document modifications for digital documents. For example, the generative text editing system can implement a grammar modification pipeline to generate a document modification by modifying grammar attributes of a digital document. Further, the generative text editing system can implement a tone modification pipeline to generate a document modification by modifying tone attributes of a digital document. Additionally, the generative text editing system can implement an internal quote extraction pipeline and/or a web-based quote extraction pipeline to generate a document modification by identifying and inserting one or more quotes into a digital document. Further, the generative text editing system can implement a freeform document editing pipeline to generate a document modification by modifying composition attributes of a digital document according to a freeform document editing query. Moreover, the generative text editing system can implement a review simulation pipeline to generate a document modification by utilizing data from a content item repository to generate a review notification. Additionally, the generative text editing system can implement an autonomous completion pipeline to generate a document modification by autonomously completing one or more portions of a digital document.

Figure 1:
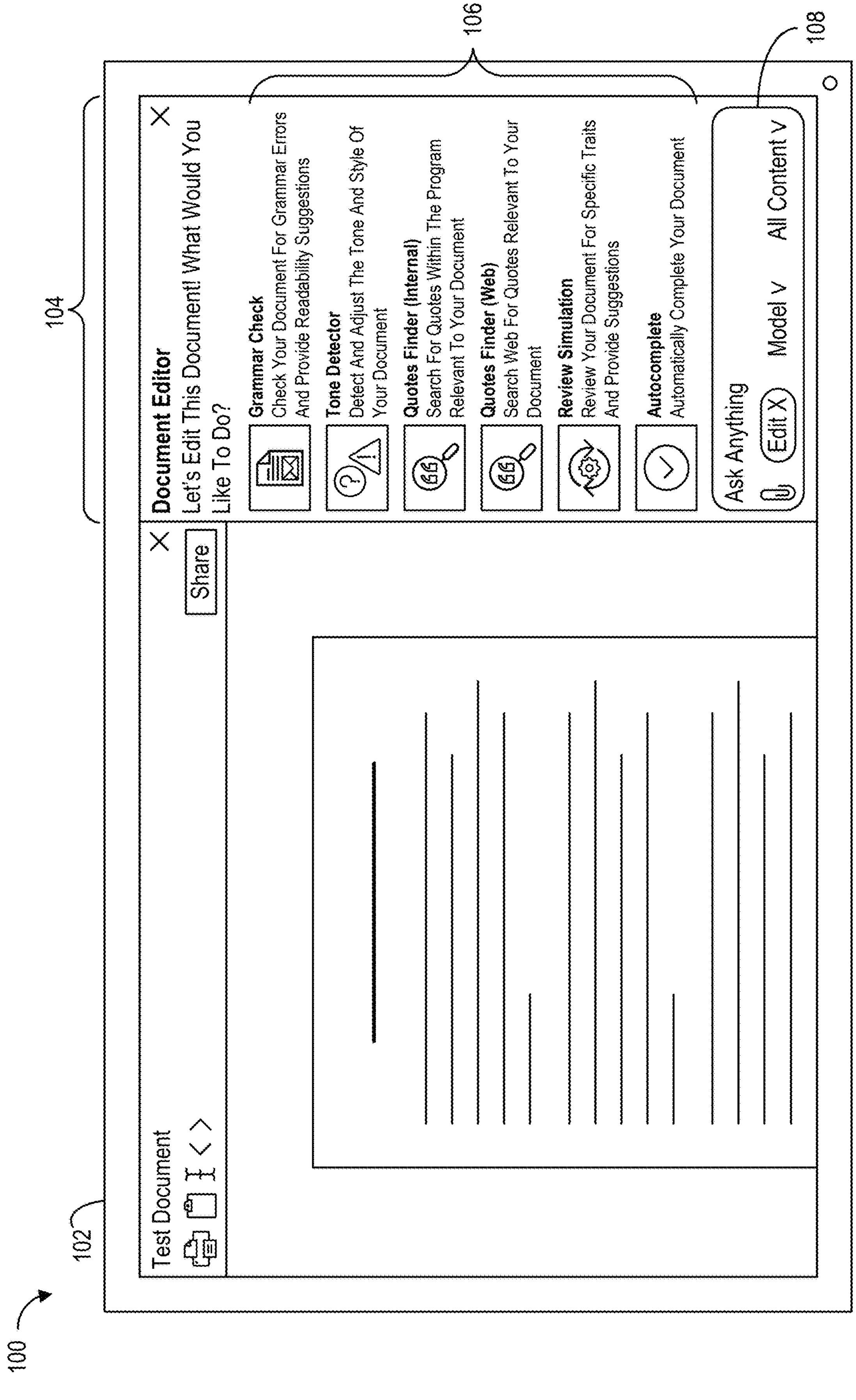
FIG. 1 illustrates an overview of a generative text editing system generating and providing a generative document editor for display on a client device in accordance with one or more embodiments.

As just mentioned, the generative text editing system can utilize a variety of document editing pipelines, such as preconfigured document editing pipelines and a freeform document editing pipeline, to generate a document modification for a digital document. FIG. 1 illustrates the generative text editing system displaying, on a client device, a generative document editor that includes the pre-configured and freeform document editing pipelines in accordance with one or more embodiments. Additional detail regarding the various acts and processes introduced in relation to FIG. 1 is provided thereafter with reference to subsequent figures.

As shown in FIG. 1, the generative text editing system 100 can provide a generative document editor 104 for display on a client device 102. For example, the generative text editing system 100 can display the generative document editor 104 within a side panel of a web browser and/or of a standalone application. Further, the generative text editing system 100 can instantiate the generative document editor 104 based on receiving an indication of an interaction from the client device 102. In some embodiments, the generative text editing system 100 autonomously instantiates the generative document editor 104 based on determining a web address of the web browser displayed on the client device 102. Moreover, the generative text editing system 100 can autonomously instantiate the generative document editor 104 in conjunction with or in response to instantiating an application on the client device 102 (e.g., such as MICROSOFT WORD).

In some embodiments, the generative text editing system 100 displays (or provides for display) the digital document via an internal website of the web-browser on the client device 102. In some embodiments, the generative text editing system 100 displays (or provides for display) the digital document via a third-party website on the client device 102. Accordingly, the generative text editing system 100 can utilize the generative document editor 104 to interface with various platforms, such as internal websites, third-party websites, as well as internal document editing applications and/or third-party applications to implement functionalities of the generative document editor 104 across various modalities.

As illustrated in FIG. 1, the generative text editing system 100 can generate the generative document editor 104 to include pre-configured document editing pipeline elements 106 that correspond to pre-configured document editing pipelines. For example, based on determining an indication of an interaction with a pre-configured document editing pipeline element of the pre-configured document editing pipeline elements 106, the generative text editing system 100 can instantiate a corresponding pre-configured document editing pipeline to generate a document modification and display the document modification on the client device.

To illustrate, the generative text editing system 100 can generate the pre-configured document editing pipeline elements 106 to include a pre-configured document editing pipeline element that corresponds to a grammar modification pipeline ("Grammar Check"). The generative text editing system 100 can utilize the grammar modification pipeline to review and/or modify various grammar aspects of the digital document.

Further, the generative text editing system 100 can generate the pre-configured document editing pipeline elements 106 to include a pre-configured document editing pipeline element that corresponds to a tone modification pipeline ("Tone Detector"). The generative text editing system 100 can utilize the tone modification pipeline to review and/or modify tone attributes of the digital document.

Additionally, the generative text editing system 100 can generate the pre-configured document editing pipeline elements 106 to include an internal quote extraction pipeline element that corresponds to an internal quote extraction pipeline that the generative text editing system 100 uses to extract quotes from a content item repository ("Quotes Finder (Internal)"). In some embodiments, the generative text editing system 100 can generate the pre-configured document editing pipeline elements 106 to include a web-based quote extraction pipeline element that corresponds to a web-based quote extraction pipeline that the generative text editing system 100 uses to extract quotes from a web browser. ("Quotes Finder (Web)").

Moreover, the generative text editing system 100 can generate the pre-configured document editing pipeline elements 106 to include a review simulation pipeline element that corresponds to a review simulation pipeline ("Review Simulation"). Indeed, the generative text editing system 100 can utilize the review simulation pipeline to review or otherwise modify the digital document according to a review style of a user account within a content management system.

In addition, the generative text editing system 100 can generate the pre-configured document editing pipeline elements 106 to include an autonomous completion pipeline element that corresponds to an autonomous completion pipeline ("Autocomplete"). The generative text editing system 100 can utilize the autonomous completion pipeline to automate completion of a digital document.

Further, as shown in FIG. 1, the generative text editing system 100 can generate the generative document editor 104 to include a chat interface 108. The generative text editing system 100 can instantiate, based on receiving a query via that chat interface, a freeform document editing pipeline ("Ask Anything"). The generative text editing system 100 can extract one or more document editing criteria from the query and implement the freeform document editing pipeline according to the document editing criteria.

Indeed, the generative text editing system 100 can utilize the generative document editor 104 to modify various components of a digital document. To illustrate, the generative text editing system 100 can modify composition values of the digital document, such as by reviewing and/or modifying grammar attributes of the digital document, tone aspects of the digital document, and/or formatting of the digital document, among others.

Further, the generative text editing system 100 can utilize a content item repository to generate and/or otherwise augment generation of the digital document according to preferences that correspond to one or more user accounts within a content management system. For example, the generative text editing system 100 can modify execution of the pre-configured document editing pipelines and/or the freeform document editing pipeline according to data for the user account, such as preferences for the user account and/or document modification patterns associated with the user account.

Moreover, in some embodiments the generative text editing system 100 determines a subset of the document editing pipeline elements 106 to display in the generative document editor 104. For example, the generative text editing system 100 can determine the subset according to a web address of the web browser and/or an application in which the generative text editing system 100 instantiates the generative document editor 104. In some embodiments, the generative text editing system 100 receives a digital document (e.g., such as via the chat interface 108) and determines the subset according to the digital document.

In some embodiments, the generative text editing system 100 operates in an always on mode to proactively scan a digital document, identify content to modify (using one or more of the document editing pipelines), and apply fixes. Indeed, the generative text editing system 100 can proactively run one or more document editing pipelines based on user selection of an always on mode (which may include selections of specific pipelines to turn on and/or off in the always on mode).

As previously mentioned, the generative text editing system 100 provides a variety of technical advantages relative to conventional systems. For example, the generative text editing system 100 improves operational flexibility compared to conventional computing systems. To illustrate, rather than relying on fixed editing functions, the generative text editing system 100 can instantiate, via the generative document editor, several different types of preconfigured and/or freeform document editing pipelines to generate different types of document modifications. Further, rather than utilizing one-size-fits-all tools that function solely on system prompts or prior training, the generative text editing system 100 integrates stored content items to adapt and inform generative models on an individualized basis for user accounts. Accordingly, rather than being limited to implementing rigid, fixed, and/or one-size-fits-all workflows that are agnostic to user account preferences, content, and/or internal policies, the generative text editing system 100 can utilize the generative document editor, in conjunction with the content item repository, to generate document modifications that tailored to user account preferences and/or policy guidelines within a content management system.

Further, due at least in part to the improvements in operational flexibility compared to conventional systems, the generative text editing system 100 can improve accuracy of document modifications compared to conventional systems. Indeed, the generative text editing system 100 can utilize the generative document editor and the content item repository to accurately identify various levels of document modification trends within a content management system, such as document modification trends that are specific to a user account, a group of user accounts, or a content management system. Further, based on identifying the document modification trends, the generative text editing system 100 can generate a document modification based on stored content items (and modification trends) rather than relying on broad or otherwise fixed heuristics or model parameters that do not account for user account-level nuances or system-level preferences. Accordingly, the generative text editing system 100 generates document modifications that accurately reflect various levels of document modification preferences.

Moreover, the generative text editing system 100 can improve computational efficiency compared to conventional systems. Indeed, through the generative document editor, the generative text editing system 100 can instantiate a variety of document editing pipelines to generate different types of document modifications that are tailored to individual user account content and/or that accurately reflect system-level practices, thus avoiding the need to repeatedly perform document modification processes and saving the computational resources that would be consumed through said repeated modifications. For example, by providing document editing pipeline elements that correspond to different document editing pipelines, and therefore different workflows and different types of document modifications within the generative document editor, the generative text editing system 100 reduces the computational resources (e.g., such as bandwidth, processing power, and/or memory) required to navigate through various webpages, user interfaces, and/or applications, thus providing a technical improvement in computational efficiency relative to conventional systems.

Figure 2:
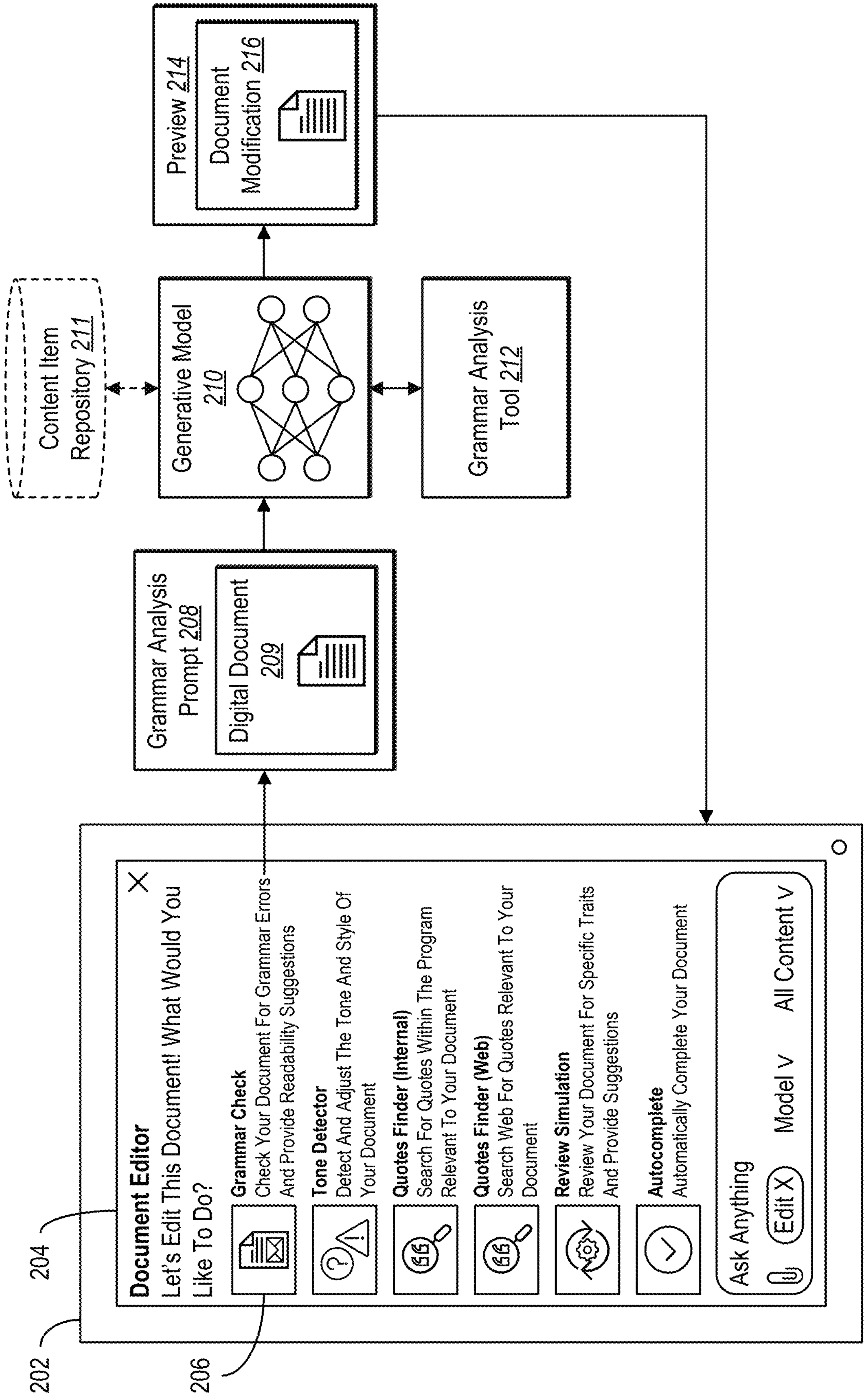
FIG. 2 illustrates an example overview of the generative text editing system instantiating a grammar modification pipeline of a generative document editor in response to determining an indication of an interaction with a grammar modification pipeline element in accordance with one or more embodiments.

As previously mentioned, the generative text editing system 100 can generate pre-configured document editing pipelines within a side panel of a client device. FIG. 2 illustrates the generative text editing system 100 generating a document modification based on determining an interaction with a grammar modification pipeline element in accordance with one or more embodiments.

As shown in FIG. 2, the generative text editing system 100 can display a generative document editor 204 of a client device 202. As used herein, the term "generative document editor" can refer to a generative artificial intelligence (AI) framework that the generative text editing system 100 instantiates to modify digital documents according to certain criteria. A generative document editor can include or be made up of one or more generative models, such as large language models (LLMs) that function based on specialized prompts to execute document editing functions. The generative document editor can also include front-facing user interface components, such as a generative editor interface within a side panel. A generative document editor can include one or more pre-configured document editing pipelines (and corresponding pre-configured document editing pipeline elements within the side panel) and/or a free-form document editing pipeline.

In some embodiments, the generative text editing system 100 displays the generative document editor 204 within a side panel of a client device. For example, the generative text editing system 100 can modify a webpage of a web browser (e.g., displayed on a client device) to include a side panel that displays the generative document editor 204 (e.g., through a browser extension). Moreover, the generative text editing system 100 can modify a user interface of an application (e.g., displayed on a client device) to include the side panel that displays the generative document editor 204 (e.g., through an add-in).

Indeed, the generative text editing system 100 can utilize the generative document editor 204 to instantiate pre-configured document editing workflows and/or interactions with a generative model. As used herein, the term "pre-configured document editing pipeline" can refer to a workflow that the generative text editing system 100 utilizes to perform particular types of preset or pre-defined modifications on digital documents. Indeed, the generative text editing system 100 can pre-configure the document editing pipeline to perform certain document modification tasks. For example, the generative text editing system 100 can instantiate different pre-configured document editing pipelines to determine and modify composition attributes of the digital document (e.g., such as grammar attribute and/or tone attributes, among others), where the pre-configuring can include defining specialized prompts instructing a generative model to execute one or more functions as part of carrying out an editing pipeline. In some embodiments, the generative text editing system 100 can modify one or more of the pre-configured document editing pipeline, such as based on interactions from user accounts or based on determining document modification patterns from a user account and or from data of a content item repository (e.g., that the generative text editing system 100 utilizes to store or otherwise host content items, such as digital documents, within a content management system).

As shown, the generative text editing system 100 can receive an interaction with a grammar modification pipeline element 206 that corresponds to a grammar modification pipeline. As used herein, the term "grammar modification pipeline" can refer to a workflow that the generative text editing system 100 implements, via the generative document editor 204, to modify specific composition attributes in the form of grammar attributes. For example, the generative text editing system 100 can implement the grammar modification pipeline to identify grammar attribute errors in a digital document (e.g., where the different elements can be aspects of grammar such as punctuation, spelling, verb tense, sentence length, paragraph length, etc.). Further, the generative text editing system 100 can utilize the grammar modification pipeline to correct or otherwise modify the grammar attribute errors in the digital document 209. To illustrate, the generative text editing system 100 can implement, via the grammar modification pipeline, a generative model in an agentic fashion to call one or more grammar modification tools (e.g., via an API), to identify and/or correct the grammar attribute errors.

As shown in FIG. 2, based on determining the indication of the interaction with the grammar modification pipeline element 206, the generative text editing system 100 can generate a grammar analysis prompt 208 to provide to a generative model 210. As used herein, the term "grammar analysis prompt" can refer to a natural language instruction that the generative text editing system 100 provides to a generative model that instructs the generative model to analyze specific composition attributes in the form of grammar attributes of a digital document 209. In some embodiments, the generative text editing system 100 autonomously generates the grammar analysis prompt 208 in response to determining the indication of the interaction with the grammar modification pipeline element 206. In some embodiments, the generative text editing system 100 can receive the grammar analysis prompt from a user account in response to or in conjunction with determining the indication of the interaction with the grammar modification pipeline element 206.

As shown, the generative text editing system 100 can include a digital document 209 in the grammar analysis prompt 208. As used herein, the term "digital document" can refer to a digital object or a digital file that includes information such as digital text, images, and/or other multimedia content data interpretable by a computing device (e.g., a client device) to present information to a user. For example, a digital document can have a particular file type or file format. In some cases a digital document can refer to a remotely stored (e.g., cloud-based) item or a link (e.g., a link or reference to a cloud-based or web-based digital document).

In some embodiments, the digital document 209 Similarly, as used herein, the term "digital content item" (or simply "content item") can refer to a digital document. Further, a content item can include a file or a folder such as a digital text file, a digital image, a digital audio file, a webpage, a website, a digital video file, a web file, a link a digital document file, or some type of file or digital object. Further, a content item can have a particular file type or file format, which may differ for different types of digital content items (e.g., digital documents, digital images, digital videos, or digital audio files). In some instances, a content item can be a content clip that indicates (or links/references) a discrete selection or segmented sub-portion of content from a webpage or some other content item or source. Further, a content item can include application-specific content that is siloed to a particular computer application but is not necessarily accessible via a file system or via a network connection. A digital content item can be editable or otherwise modifiable and can also be shareable from one user account (or client device) to another. In some cases, a digital content item is modifiable by multiple user accounts (or client devices) simultaneously and/or at different times. In some embodiments, a digital content item can include a saved work state within an application and/or a webpage of a client device.

As shown in FIG. 2, the generative text editing system 100 can identify the digital document 209 based on detecting presentation in a user interface (e.g., within a browser or a document editing application), based on express selection at a client device, and/or based on an indication within a text-based query for generative editing. For example, the generative text editing system 100 can receive an upload of the digital document 209 via the generative document editor 204 (e.g., such as via a chat interface of the generative document editor 204). In some embodiments, the generative text editing system 100 identifies the digital document 209 based on receiving a link that identifies a virtual location (e.g., such as a virtual storage location or a web address that hosts the digital document 209). For example, the generative text editing system 100 can display (or provide for display) the generative document editor 204 as an add-in within a webpage of a web browser of the client device 202. In parallel, the generative text editing system 100 can display (or provide for display) a digital document 209 document editing application (e.g., such as MICROSOFT WORD). Accordingly, the generative text editing system 100 can utilize the generative document editor 204 to interact with or otherwise detect changes in the digital document 209 via the document editing application, while displaying (or providing for display) the generative document editor 204 in the webpage of the web browser of the client device.

In some embodiments the generative text editing system 100 can receive or generate the grammar analysis prompt 208 by receiving a grammar analysis query via a chat interface of the generative document editor 204. The generative text editing system 100 can generate or modify the grammar analysis prompt 208 to instruct the generative model 210 based at least in part on the grammar analysis query, along with preconfigured (unmodified) prompt language specific to grammar analysis. Indeed, the grammar analysis prompt 208 can include two parts: one part that is fixed to instruct the generative model 210 to execute grammar analysis functions, and another part that is customized according to language in a query. In some embodiments, responsive to determining the indication of the interaction with the grammar modification pipeline element 206, the generative text editing system 100 generates a grammar modification clarification request to provide to the user account (e.g., such as via the generative document editor 204). For example, the generative text editing system 100 can generate the grammar modification clarification request to request information and/or instructions regarding modifications for the generative text editing system 100 to perform.

As shown in FIG. 2, the generative text editing system 100 can provide the grammar analysis prompt to the generative model 210. As used herein, the term "generative model" refers to a machine learning model that is configured to generate new data samples (e.g., generative outputs) that are statistically consistent with the data on which the model was trained. Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs.

As shown in FIG. 2, based on providing the grammar analysis prompt 208 to the generative model 210, the generative text editing system 100 can utilize a grammar analysis tool 212 to perform a grammar analysis of grammar attributes of the digital document 209. For instance, the generative model 210 can perform agentic functions to execute tool calls that access and implement the grammar analysis tool 212, complete with parameters (or code) to instruct the tool to perform a grammar function on a particular document or selected text. As used herein, the term "grammar analysis tool" can refer to a component, subroutine, program, or executable computer code block that identifies and/or modifies composition attributes (e.g., such as grammar attributes) of the digital document 209. For example, the grammar analysis tool can be an internal component of a generative model (e.g., such as a grammar analysis layer of the generative model 210). Moreover, the grammar analysis tool can be a part of a separate codebase, program, or application accessible through an API, such as an external microservice.

Accordingly, the generative text editing system 100 can utilize the grammar analysis tool 212 to perform various grammar analysis tasks on the digital document 209, such as syntactic and/or grammatical diagnostics of (selected portions of) the digital document 209. Additionally, the grammar analysis tool 212 can involve performing part-of-speech tagging on the digital document 209 to label a grammatical role for words in the digital document 209. Further, the grammar analysis tool 212 can take the form of a dependency parser to map grammatical relationships between words. Moreover the grammar analysis tool 212 can be a statistical error detector, such as an n-gram or transformer-based model to flag low-probability sequences of words. Additionally, the generative text editing system 100 can utilize the grammar analysis tool 212 to generate a contextual understanding of the digital document 209 (e.g., based on performing the pre-analysis tasks). For example, the generative text editing system 100 can utilize the grammar analysis tool 212 to weigh rule-based flags against stylistic or contextual appropriateness (e.g., such as deciding not to modify deliberately informal phrasing). Further, the generative text editing system 100 can utilize the grammar analysis tool 212 to identify and modify grammar attribute errors (or suggestions), such as punctuation errors, spelling errors, verb tense errors, sentence length errors, paragraph length errors, among others.

Further, as shown in FIG. 2, the generative text editing system 100 can utilize a content item repository 211 to inform operations that the generative text editing system 100 performs utilizing the generative model 210 (and/or utilizing the grammar analysis tool 212). As used herein, the term "content item repository" can refer to a database that the generative text editing system 100 utilizes to store information relating to a content management system (e.g., the content management system 1006 of FIG. 10, discussed below), such as content items, metadata associated with content items, and/or metadata associated with user accounts.

For example, the generative text editing system 100 can analyze the content item repository 211 to determine grammar trends (and/or express preferences) for a user account within the content management system (e.g., such as a user account that is associated with the digital document 209). To illustrate, the generative text editing system 100 can determine the grammar trends for the user account by determining certain types of grammar errors in multiple content items associated with the user account. The generative text editing system 100 can utilize the grammar trends to inform the grammar analysis of the digital document 209 (e.g., such as prioritizing identifying the grammar errors from the multiple content items in the digital document 209).

As a further example, the generative text editing system 100 can analyze the content item repository 211 to determine that content items associated with a user account (e.g., such as the user account that the generative text editing system 100 received the digital document 209) that have sentence lengths that are above an average (or threshold) sentence length. Further, the generative text editing system 100 can determine the average (or threshold) sentence length from content items in the content item repository 211 and/or a subset of content items in the content item repository 211. Based on determining that content items associated with the user account have sentence lengths that are above the average (or threshold) sentence length, the generative text editing system 100 can utilize the grammar analysis tool to prioritize (e.g., compared to other types of grammar attribute errors) identifying and remedying sentences in the digital document 209 that have an above-average (or above-threshold) sentence length.

Moreover, the generative text editing system 100 can identify, via the content item repository 211, explicit definitions of grammar modifications to make to the digital document 209, such as by identifying a grammar modification guidelines document in the content item repository 211 and explicitly determining the grammar modifications from the grammar modification guidelines document. In some embodiments, the generative text editing system 100 determines, from the content item repository 211, implicit grammar modifications to make to the digital document 209, such as by identifying grammar modification trends from data of the content item repository 211 and applying the grammar modification trends to the digital document 209.

As shown in FIG. 2, based on utilizing the generative model 210 to analyze the digital document 209, the generative text editing system 100 can generate a preview 214 of a document modification 216. As used herein, the term "document modification" can refer to a change or update to text and/or other content of a digital document resulting from a pre-configured document editing pipeline or a free-form document editing pipeline. In some embodiments the generative text editing system 100 generates the document modification by modifying composition attributes of the digital document (e.g., such as grammar attributes and/or tone attributes). In some embodiments the generative text editing system 100 generates the document modification to include a quote to augment subject matter of the digital document. A document modification can be in-line with a digital document or can be a preview within a side panel that, once accepted, applies to the digital document. In some embodiments, a document modification takes the form of comments or other review-based additions to the digital document according to one or more review patterns of a user account within the content management system. In some embodiments a document modification is a completed version of the digital document. In some embodiments, the generative text editing system 100 generates the document modification to include marked up text (e.g., such as strikethrough, underlining, and/or highlighting) to indicate modifications to the digital document.

In some cases, the generative text editing system 100 can generate the document modification 216 to be unformatted natural language text (e.g., selectable for a user account to copy and paste into the digital document 209). In some embodiments the generative text editing system 100 generates the document modification 216 to be a new document based on the digital document 209.

As shown in FIG. 2, the generative text editing system 100 can provide the preview 214 to the client device 202. For example, the generative text editing system 100 can provide the preview 214 to the client device 202 and request an indication of a confirmation of the preview 214 from the user account. To illustrate, the generative text editing system 100 can display the preview 214 of the document modification 216 within a preview window of the client device 202, such as by displaying the preview window within the generative document editor 204. In some embodiments, the generative text editing system 100 can generate the preview 214 of the document modification 216 to be a summary of the document modification 216 that describes grammar errors in the digital document 209 and corresponding remedies to the errors in the document modification 216.

Figure 3:
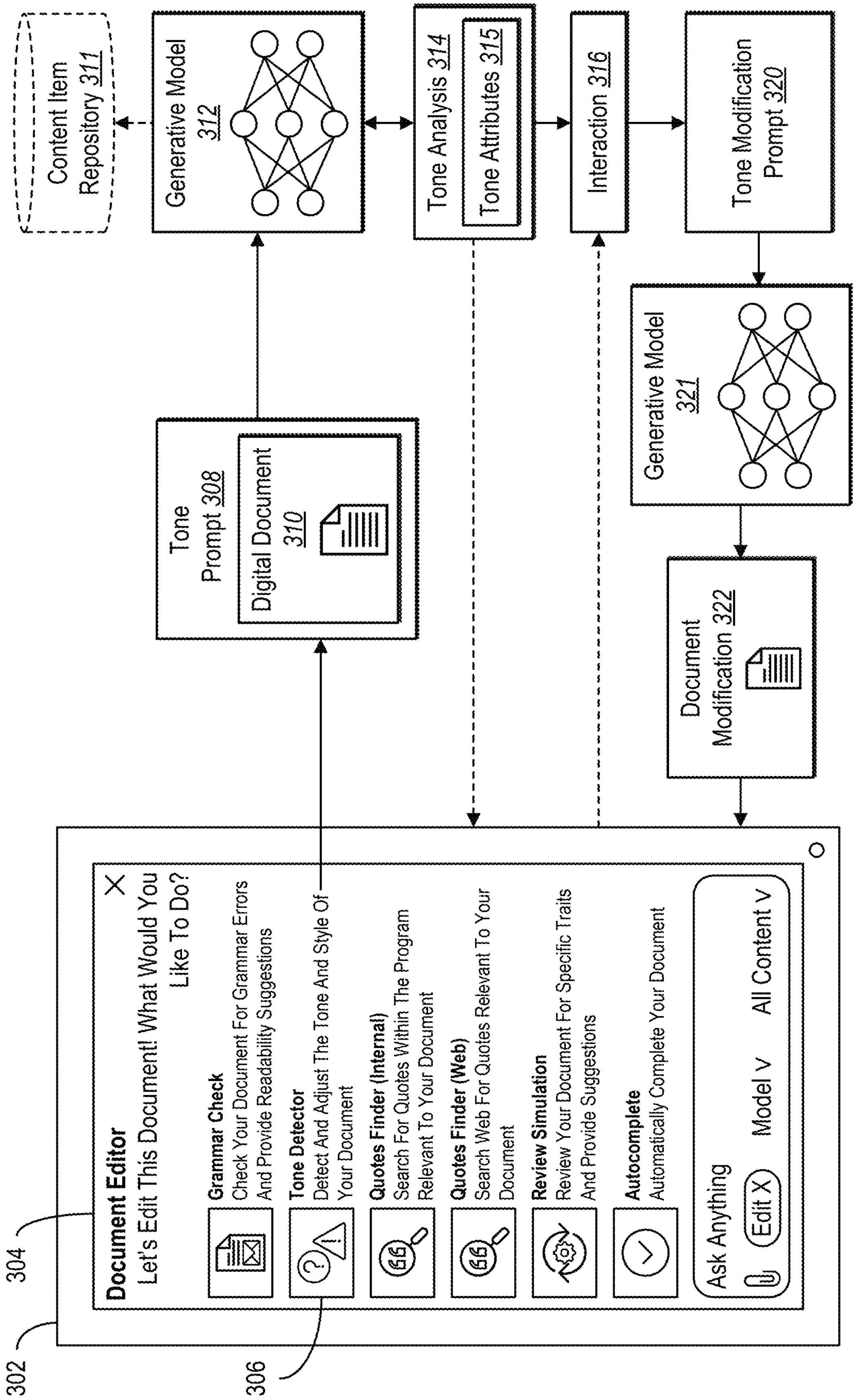
FIG. 3 illustrates an example overview of the generative text editing system instantiating a tone modification pipeline of a generative document editor in response to determining an indication of an interaction with a tone modification pipeline element in accordance with one or more embodiments.

As previously mentioned, the generative text editing system 100 can generate a generative document editor to include a tone modification pipeline. FIG. 3 illustrates the generative text editing system 100 generating a tone analysis of a digital document in response to determining an indication of an interaction with a tone modification pipeline element in accordance with one or more embodiments.

As shown in FIG. 3, the generative text editing system 100 can display a generative document editor 304 within an interface presented on client device 302. Specifically, the generative text editing system 100 can generate the generative document editor 304 to include pre-configured document editing pipeline elements that correspond to pre-configured document editing pipelines. For example, the generative text editing system 100 can generate the generative document editor 304 to include a tone modification pipeline element 306. Indeed, the generative text editing system 100 can generate the tone modification pipeline element 306 to be selectable to instantiate a tone modification pipeline.

As used herein, the term "tone modification pipeline" can refer to a workflow that the generative text editing system 100 implements, via the generative document editor, to modify composition attributes, such as tone attributes, of a digital document. For example, the generative text editing system 100 can utilize the tone modification pipeline to identify and modify expressive or stylistic elements of a digital document, such as linguistic characteristics of the document. For example, the generative text editing system 100 can utilize the generative text editing system can instantiate the tone modification pipeline to modify tone attributes of the digital document, such as emotional elements, professionalism elements, formal elements (e.g., elements that indicate tone formality), assertiveness elements, humility elements, confidence elements, enthusiasm elements, empathy elements, humor elements, urgency elements, among others. Further, the generative text editing system 100 can utilize the tone modification pipeline to identify and remedy tonal inconsistencies within the digital document.

As shown in FIG. 3, based on determining an indication of an interaction with the tone modification pipeline element, the generative text editing system 100 can generate a tone prompt 308. As used herein, the term "tone prompt" can refer to a natural language instruction that the generative text editing system 100 provides to a generative model that instructs the generative model to analyze or otherwise evaluate specific composition attributes in the form of tone attributes of a digital document. In some embodiments, the generative text editing system 100 autonomously generates the tone prompt in response to determining the indication of the interaction with the tone modification pipeline element 306. In some embodiments, the generative text editing system 100 receives the tone prompt from a user account in response to or in conjunction with determining the indication of the interaction with the tone modification pipeline element 306. For example, the generative text editing system 100 can receive the tone prompt via a chat interface of the generative document editor. Further, the generative text editing system 100 can generate or otherwise modify the tone prompt to instruct a generative model to identify, interpret, and/or characterize stylistic and/or expressive features of the digital document. Further, the generative text editing system 100 can generate or otherwise modify the tone prompt to instruct the generative model to quantify tone alignment and/or to generate modifications that improve coherence between tone attributes of the digital documents. Further, in some embodiments the generative text editing system 100 generates the tone prompt to instruct the generative model 312 to generate tonal recommendations to align various tone attributes of the digital document with a communicative intent and/or audience expectation of the digital document.

As shown in FIG. 3, the generative text editing system 100 can generate the tone prompt 308 to include or reference a digital document 310. In some embodiments, the generative text editing system 100 receives the digital document 310 via a chat interface of the generative document editor 304. In some embodiments, the generative text editing system 100 receives an indication of a virtual location of the digital document 310 via a chat interface of the generative document editor 304. In some embodiments, responsive to determining the indication of the interaction with the tone modification pipeline, the generative text editing system 100 modifies the generative document editor 304 to include a tone modification interface and receives the digital document 310 via the tone modification interface. For example, the generative text editing system 100 can instantiate the tone modification interface and can provide, within the tone modification interface, an instruction for the user account to provide the digital document 310 for the generative text editing system 100 to analyze via the tone modification pipeline.

As shown in FIG. 3, the generative text editing system 100 can provide the tone prompt 308 and the digital document 310 to a generative model 312. The generative text editing system 100 can utilize the generative model 312 to generate a tone analysis 314 of the digital document 310. Indeed, the generative text editing system 100 can generate the tone analysis 314 to indicate one or more tone attributes 315 within the digital document 310. As used herein, the term "tone attribute" can refer to a feature that represents a specific tonal dimension (e.g., tonal quality) or a tone label of the digital document 310 (e.g., such as "Professional," "Direct," "Confident," and/or "Flowery," among others. In some embodiments, the generative text editing system 100 can generate the tone attribute to include one or more tone scores (e.g., such as a composition attribute value) that quantifies the tonal quality in each of a plurality of labeled tone attribute categories (e.g., such as "Professional: 8/10," "Direct: 7/10," "Confident: 8/10," and/or "Flowery: 3/10," among others). Indeed, the generative text editing system 100 can generate the tone attribute and/or the tone score to identify and/or quantify an expressive style of the digital document.

Further, the generative text editing system 100 can generate the tone analysis 314 to include suggested tonal changes for the digital document 310. To illustrate, the generative text editing system 100 can generate the tone analysis 314 to include the one or more tone attributes 315, a tone score for the tone attribute (or each tone attribute from among the set of labeled attribute categories), as well as a suggestion to increase or decrease the tone score (e.g., by changing language of the digital document 310 to increase or decrease a prevalence of the one or more tone attributes 315 within the digital document 310). Further, in some embodiments the generative text editing system 100 can generate the tone analysis 314 to include a preview of the suggested tonal changes.

As shown in FIG. 3, in some embodiments, the generative text editing system 100 can utilize a content item repository 311 to augment operations that the generative text editing system 100 performs utilizing the generative model 312. For example, the generative text editing system 100 can generate the tone analysis 314 and/or identify the one or more tone attributes 315 by extracting or otherwise analyzing data or metadata from the content item repository 311. Further, the generative text editing system 100 can generate the suggested tonal changes for the digital document 310 based on the content item repository 311. For example, the generative text editing system 100 can explicitly determine the tonal changes for the digital document 310, such as by identifying a tonal modifications guideline document in the content item repository 311 and applying or suggesting tonal changes for the digital document 310. In some embodiments, the generative text editing system 100 implicitly determines the tonal changes for the digital document 310, such as by determining tonal modification trends from data of the content item repository and applying, or suggesting application of, tonal modifications according to the tonal modification trends.

For example, the generative text editing system 100 can determine a type of the digital document 310 and can determine the suggested tonal changes according to the type of the digital document 310. Further, in some embodiments the generative text editing system 100 determines user accounts within a content management system that are associated with the digital document 310. The generative text editing system 100 can generate the suggested tonal changes according to data associated with the user accounts.

As shown in FIG. 3, the generative text editing system 100 can provide the tone analysis 314 to the client device 302. For example, the generative text editing system 100 can display the tone analysis 314 in the generative document editor 304. Based on displaying the tone analysis 314 on the client device 302, the generative text editing system 100 can determine or otherwise receive an interaction 316 with the tone analysis 314. For example, the generative text editing system 100 can determine the interaction 316 by determining a click, tap, or a swipe to confirm or otherwise accept the tone analysis 314. In some embodiments, the generative text editing system 100 determines the interaction 316 by receiving, via the generative document editor 304, a response to the tone analysis 314. Further, in some embodiments the generative text editing system 100 can generate the tone analysis 314 to include tone attribute slider elements that correspond to the one or more tone attributes 315. The generative text editing system 100 can determine the interaction 316 by determining an indication of an interaction with the tone slider element.

As shown in FIG. 3, based on determining the interaction 316 with the tone analysis 314 (e.g., via the generative document editor 304), the generative text editing system 100 can generate a tone modification prompt 320. Indeed, the generative text editing system 100 can determine one or more changes to make to the digital document 310 based on the interaction 316 with the tone analysis 314 and can generate the tone modification prompt 320 to include an instruction to modify the digital document 310 according to the interaction 316.

As illustrated in FIG. 3, the generative text editing system 100 can provide the tone modification prompt 320 to a generative model 321. In some embodiments, the generative model 321 is the same model as the generative model 312. In some embodiments, the generative model 321 has the same underlying architecture as the generative model 312, but the generative text editing system 100 prompts the underlying architecture to act differently. For example, the generative text editing system 100 can generate the tone prompt 308 to cause the generative model 312 to analyze the digital document 310 and the generative text editing system 100 can generate the tone modification prompt 320 to cause the generative model 321 to modify the digital document 310. Accordingly, through prompt engineering (e.g., generating the tone prompt 308 and the tone modification prompt 320), the generative text editing system 100 can utilize a same underlying architecture to perform different tasks.

As shown in FIG. 3, based on providing the tone modification prompt 320 to the generative model 321, the generative text editing system 100 can utilize the generative model 321 to generate a document modification 322. For example, the generative text editing system 100 can generate the document modification 322 according to one or more changes to the tone analysis 314 that the generative text editing system 100 determines from the interaction 316. Further, the generative text editing system 100 can provide the document modification 322 for display on the client device 302. Moreover, in some embodiments, the generative text editing system 100 provides a preview of the document modification 322 for display on the client device 302 and can provide the document modification 322 for display on the client device 302 in response to receiving a confirmation of the preview.

Further, the generative text editing system 100 can instruct the generative model 312 and/or the generative model 321 to interface with a document modification tool to generate the tone analysis 314 and/or the document modification 322. For example, the generative text editing system 100 can instruct the generative model 312 and/or the generative model 321 to interface with a document modification tool by providing instructions to interface with a tone classification subsystem, a tone adjustment API, a tone normalization agentic subsystem, a stylistic transfer subsystem, a tone scoring API, or a tone registry, among others. In some embodiments, the generative text editing system 100 instructs the generative model 312 and/or the generative model 321 to interface with the document modification tool by instructing the generative model 312 and/or the generative model 321 to interface with the content item repository 311.

Figure 4:
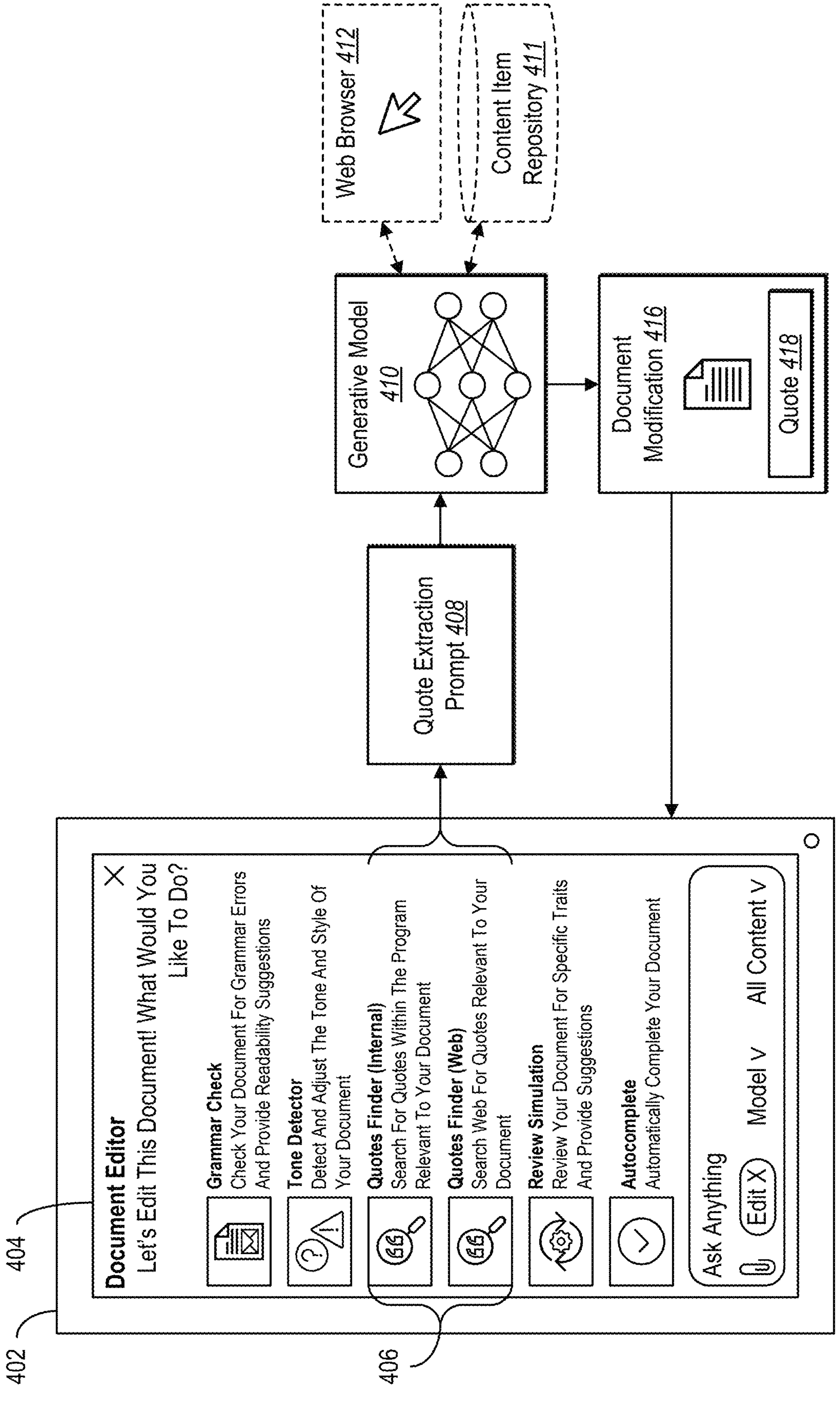
FIG. 4 illustrates an example overview of the generative text editing system instantiating a quote extraction pipeline of a generative document editor in response to determining an indication of an interaction with a quote extraction pipeline element in accordance with one or more embodiments.

As previously mentioned, the generative text editing system 100 can generate a generative document editor to include quote extraction pipelines, such as an internal quote extraction pipeline and a web-based quote extraction pipeline. FIG. 4 illustrates the generative text editing system 100 generating a document modification that includes a quote based on determining an interaction with a quote extraction pipeline element that corresponds to a quote extraction pipeline in accordance with one or more embodiments.

As shown in FIG. 4, the generative text editing system 100 can display quote extraction pipeline elements 406 within a generative document editor 404 displayed on a client device 402. Indeed, the generative text editing system 100 can generate the quote extraction pipeline elements 406 to include an internal quote extraction pipeline element and a web-based quote extraction pipeline element. As used herein, the term "internal quote extraction pipeline" can refer to a workflow (including one or more generative models) that the generative text editing system 100 instantiates to locate quotes (e.g., to add to a digital document) from internal documents of a system (e.g., such as a content management system). For example, the generative text editing system 100 can utilize back-end connections and pipelines to search different content items stored at different locations within the system.

As shown in FIG. 4, the generative text editing system 100 can generate a quote extraction prompt 408 to provide to a generative model 410. Indeed, the generative text editing system 100 can generate the quote extraction prompt 408 in response to determining an indication of an interaction with a quote extraction pipeline element of the quote extraction pipeline elements 406. As used herein, the phrase "quote extraction prompt" can refer to an instruction for a generative model that the generative text editing system 100 generates to indicate parameters of subject matter for a generative model to search for as well as parameters for one or more virtual locations for the generative model to search to locate the subject matter. In some embodiments the generative text editing system 100 includes a digital document with the quote extraction prompt. Further, in some embodiments the generative text editing system 100 receives at least a part of the quote extraction prompt from a user account via an interaction within the generative document editor 404.

In some embodiments, the generative text editing system 100 generates the quote extraction prompt 408 to indicate a content scope for the generative model to search. For example, in response to determining an indication of an interaction with the internal quote extraction pipeline element, the generative text editing system 100 can generate the quote extraction prompt 408 to indicate search location indicators in the content item repository 411 (e.g., such as a folder and/or a stack, among others) for the generative model 410 to search to identify or otherwise locate the quote 418. Further, in response to determining an indication of an interaction with the web-based quote extraction pipeline element, the generative text editing system 100 can generate the quote extraction prompt 408 to indicate search location indicators of the web browser 412 (e.g., such as specific web domains) for the generative model 410 to search to identify or otherwise locate the quote 418. Further, in some embodiments the generative text editing system 100 can implicitly or explicitly determine the search location indicators (for the content item repository 411 and/or the web browser 412) based on data from the content item repository 411.

For example, in some embodiments, responsive to determining an indication of an interaction with a quote extraction pipeline element of the quote extraction pipeline elements 406, the generative text editing system 100 can launch a quote extraction interface within the client device 402. In some embodiments, the generative text editing system 100 can launch the quote extraction interface by modifying the generative document editor 404 to be the quote extraction interface. Based on launching the quote extraction interface, the generative text editing system 100 can generate and provide (via the client device 402) a quote extraction query to the user account. The generative text editing system 100 can receive a response to the quote extraction query that includes the digital document and/or components of the quote extraction prompt. Further, the generative text editing system 100 can generate the quote extraction prompt based on the response to the quote extraction query.

Moreover, responsive to determining an indication of an interaction with the internal quote extraction pipeline element, the generative text editing system 100 can generate the quote extraction prompt 408 to instruct the generative model to search a content item repository 411 for a quote 418. Further, based on determining the indication of the interaction with the internal quote extraction pipeline element, the generative text editing system 100 can generate the quote extraction prompt 408 to include or otherwise indicate permission levels of content items within the content item repository 411 for the generative model 410 to access. For example, the generative text editing system 100 can determine the permission levels according to permission levels of a user account associated with the client device 402.

Responsive to determining an indication of an interaction with the web-based quote extraction pipeline element, the generative text editing system 100 can generate the quote extraction prompt 408 to instruct the generative model to search a web browser 412 for the quote 418. For example, the generative text editing system 100 can generate the quote extraction prompt 408 to indicate one or more search terms (e.g., natural language descriptors) and/or one or more websites for the generative model 410 to search. Further, the generative text editing system 100 can utilize the content item repository 411 to augment the search of the web browser 412. For example, the generative text editing system 100 can identify, from the content item repository 411, websites and/or online sources that are referenced in content items stored at the content item repository 411. For example the generative text editing system 100 can determine a document type for a digital document that corresponds to the quote extraction prompt 408 (e.g., for the digital document that the generative text editing system 100 instantiates a quote extraction pipeline to augment). The generative text editing system 100 can utilize the content item repository 411 to identify one or more similar document types and can determine websites and/or online locations that correspond to the similar document types. Based on identifying the websites and/or online locations that correspond to the similar document types from the content item repository 411, the generative text editing system 100 can utilize the web browser to search the websites and/or online locations for the quote 418.

As shown in FIG. 4, the generative text editing system 100 can utilize the generative model 410 to generate a document modification 416 that includes the quote 418. In some embodiments the generative text editing system 100 generates the quote 418 to include a source citation that indicates a virtual location (e.g., such as a webpage of the web browser and/or a specific location in the content item repository 411, such as a stack and/or a folder), from which the generative text editing system 100 extracted the quote 418.

As illustrated in FIG. 4, the generative text editing system 100 can provide the document modification 416 for display on the client device 402. In some embodiments, the generative text editing system 100 can provide a preview of the document modification 416 for display on the client device 402 and can provide the document modification 416 for display in response to receiving an indication of an interaction (e.g., such as a confirmation) of the preview. In some embodiments, based on receiving an indication of an interaction with the preview, the generative text editing system 100 generates a modified quote extraction prompt and provide the modified quote extraction prompt to the generative model 410 to cause the generative model 410 to search for additional quotes.

In some embodiments, the generative text editing system 100 alternates between executing the internal quote extraction pipeline (e.g., searching the content item repository 411) and executing the web-based quote extraction pipeline (e.g., searching the web browser 412). For example, the generative text editing system 100 can iteratively execute the internal quote extraction pipeline and the web-based quote extraction pipeline in response to determining iterative indications of interactions (e.g., from the user account) with the internal quote extraction pipeline element and the web-based quote extraction pipeline element. In some embodiments, the generative text editing system 100 autonomously iterates between executing the internal quote extraction pipeline and the web-based quote extraction pipeline.

Further, in some embodiments the generative text editing system 100 instructs the generative model 410 to interface with a document modification tool to identify or otherwise extract the quote 418 (from the content item repository 411 and/or the web browser 412). For example, the generative text editing system 100 can instruct the generative model 410 to interface with a storage connector interface to search the content item repository 411 and/or other virtual storage locations for a content management system. Additionally, the generative text editing system 100 can instruct the generative model 410 to interact with a document modification tool by interfacing with a web fetcher or a URL resolver. Further, the generative text editing system 100 can instruct the generative model 410 to interface with document modification tools including a content-type ingestion and normalization engine, an optical character recognition (OCR) pipeline, a boilerplate stripping model, a template stripping model, a quotation span detector, an exact matcher and aligner, a fuzzy matcher and aligner, among others. In some embodiments, the generative text editing system 100 instructs the generative model 410 to interface with the document modification tool by instructing the generative model 410 to interface with the content item repository 411.

In some embodiments, the generative text editing system 100 generates a citation for the quote 418. Specifically, the generative text editing system 100 can determine a citation format to apply to the citation from the content item repository 411. For example, the generative text editing system 100 can determine the citation format according to the digital document, a type of the digital document, one or more user accounts associated with the digital document, and/or based on a uniform citation format that corresponds to the content management system.

Figure 5:
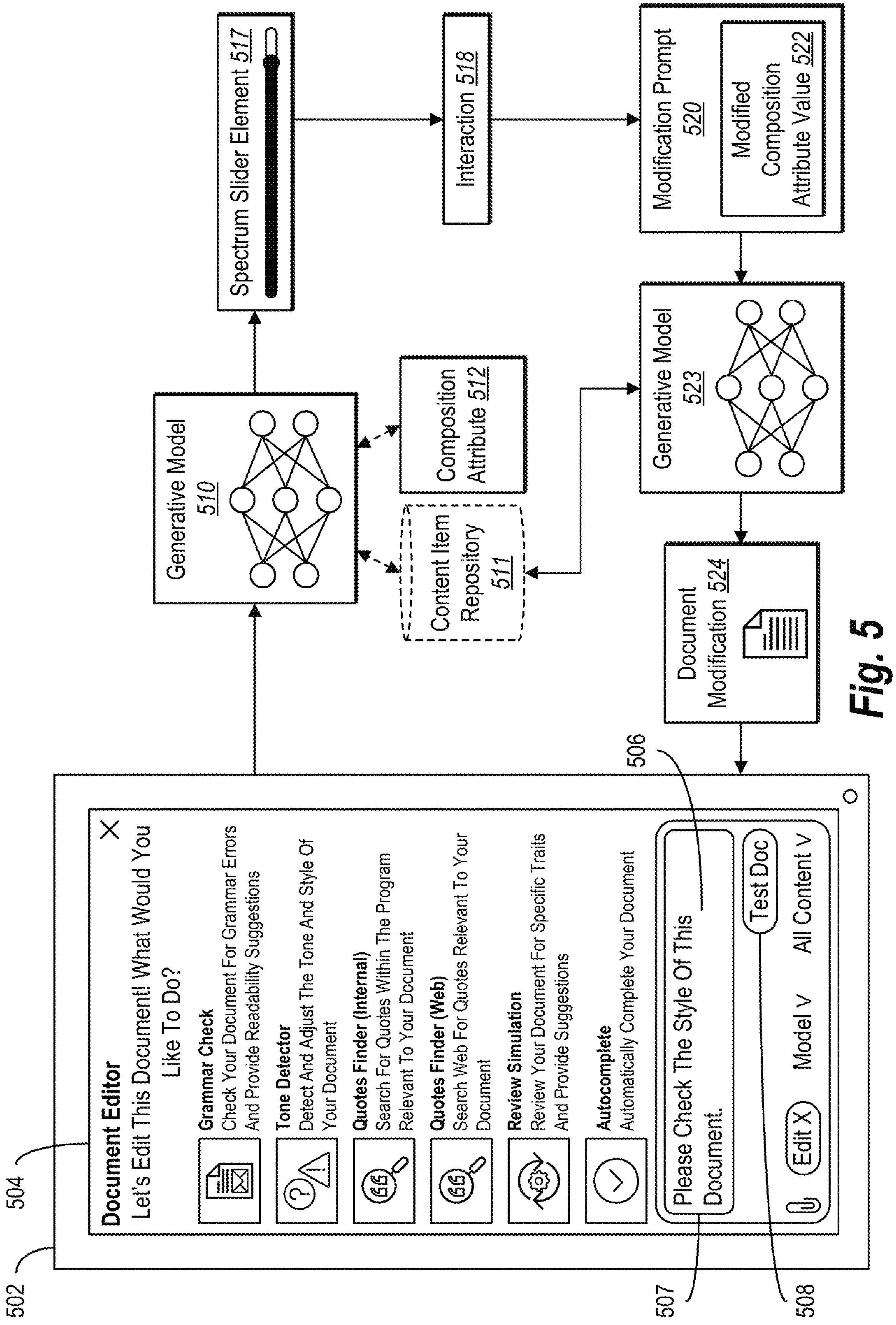
FIG. 5 illustrates an example overview of the generative text editing system instantiating a freeform document editing pipeline of a generative document editor in response to receiving a query via a chat interface of the generative document editor in accordance with one or more embodiments.

As previously mentioned, the generative text editing system 100 can utilize a freeform document editing pipeline to generate a document modification. FIG. 5 illustrates the generative text editing system 100 receiving a freeform document editing query via a generative document editor and generating a document modification according to the freeform document editing query in accordance with one or more embodiments.

As shown in FIG. 5, the generative text editing system 100 can receive a freeform document editing query 506 (e.g., "Please check the style of this document."). Indeed, the generative text editing system 100 can receive the freeform document editing query 506 via a chat interface 507 of a generative document editor 504 that the generative text editing system 100 causes to be displayed on a client device 502. Further, the generative text editing system 100 can receive a digital document 508 in conjunction with the freeform document editing query 506.

As used herein, the term "freeform document editing query" can refer to a query that the generative text editing system 100 receives from a user account that requests a review of one or more aspects of a digital document. For example, a freeform document editing query can indicate a request for the generative text editing system 100 to review one or more characteristics of a digital document, such as a grammar attribute, a tone attribute, a formatting element, an organizational structure, a layout hierarchy, and/or a section hierarchy, among others.

To illustrate, the generative text editing system 100 can receive a query via the chat interface 507 of the generative document editor 504. The generative text editing system 100 can parse the query to identify one or more digital document review indicators (e.g., such as a request to review one or more characteristics of the digital document 508). Based on identifying the one or more digital document review indicators, the generative text editing system 100 can determine that the query is the freeform document editing query 506. Based on this determination, the generative text editing system 100 can instantiate a freeform document editing pipeline.

As used herein, the term "freeform document editing pipeline" can refer to a modifiable, holistic workflow that the generative text editing system 100 instantiates in response to receiving a freeform document editing query (e.g., in response to determining that a query that the generative text editing system 100 receives via the chat interface of the generative document editor is a freeform document editing query). For example, the generative text editing system 100 can instantiate the freeform document editing pipeline by implementing, based on the freeform document editing query, components of pre-configured document editing pipelines of a generative document editor. For example, the generative text editing system 100 can implement elements of pre-configured document editing pipelines including a grammar modification pipeline (e.g., discussed above with regard to FIG. 2), a tone modification pipeline (e.g., discussed above with regard to FIG. 3), the internal quote extraction pipeline (e.g., discussed above with regard to FIG. 4), the review simulation pipeline (e.g., discussed below with regard to FIG. 6), and/or the autonomous completion pipeline (e.g., discussed below with regard to FIG. 7).

Indeed, based on receiving the freeform document editing query 506 and the digital document 508, the generative text editing system 100 can generate a freeform editing prompt to provide to a generative model 510. For example, the generative text editing system 100 can generate the freeform editing prompt to include instructions for the generative model 510 to parse or otherwise analyze the digital document 508 according to the freeform document editing query 506. In some embodiments, the generative text editing system 100 generates the freeform editing prompt by providing the freeform document editing query 506 to the generative model 510. In some embodiments, the generative text editing system 100 generates the freeform editing prompt by augmenting or otherwise modifying the freeform document editing query 506 to clarify instructions for the generative model 510.

As shown in FIG. 5, the generative text editing system 100 can utilize the generative model 510 to generate a spectrum slider element 517 that indicates a composition attribute and a composition attribute value (e.g., a discrete value selected from a range) on a composition attribute spectrum for the digital document 508. Indeed, the generative text editing system 100 can determine the composition attribute based at least in part on the freeform document editing query 506. Indeed, the generative text editing system 100 can generate the composition attribute spectrum according to a composition attribute 512. As used herein, the term "composition attribute" can refer to a structural or stylistic characteristic of a digital document that the generative text editing system 100 identifies, evaluates, or modifies within the digital document. For example, a composition attribute can include a grammar attribute, a tone attribute, and/or other elements of the digital document such as formatting, organizational structure, layout consistency, section hierarchy, among others. Moreover, as used herein, the term "composition attribute value" can refer to a quantified (e.g., scored) composition attribute. Furthermore, as used herein, the term "composition attribute spectrum" can refer to a numerically organized collection of composition attribute values.

To illustrate, the generative text editing system 100 can utilize the generative model 510 to analyze the digital document 508 to determine that the digital document 508 includes a composition attribute 512 of direct (e.g., the generative text editing system 100 can determine that the digital document 508 includes a "style" that is "direct."). Further, based on determining the composition attribute of direct, the generative text editing system 100 can determine that the digital document 508 has a composition attribute value of 8 on a composition attribute spectrum of 0-10, thus indicating that the digital document 508 has a relatively direct writing style.

In some embodiments, the generative text editing system 100 utilizes the generative model 510 to identify the composition attribute 512. In some embodiments, the generative text editing system 100 utilizes the generative model 510 to parse a composition attribute database. Indeed, the generative text editing system 100 can utilize a composition attribute database to store composition attributes and corresponding examples, composition attribute values and corresponding examples, and/or composition attribute spectrums and corresponding examples. For example, the generative text editing system 100 can provide the digital document 508 and the freeform editing prompt to the generative model 510. The generative text editing system 100 can utilize the generative model 510 to parse the digital document 508 and compare components of the digital document 508 to the composition attribute database to determine the composition attribute 512 (and/or multiple composition attributes) and the corresponding composition attribute value on the composition attribute spectrum of the digital document 508. For example, the generative text editing system 100 can determine the composition attribute 512 and the composition attribute value on the composition attribute spectrum by determining similarity scores (e.g., such as cosine similarity scores) between composition attributes, composition attribute values, and composition attribute spectrums that the generative text editing system 100 accesses from the composition attribute database.

As shown in FIG. 5 (and as will be discussed further below with regard to FIGS. 8A-8B), the generative text editing system 100 can generate a spectrum slider element 517 that spans or defines a composition attribute spectrum that includes a number of composition attribute values. The generative text editing system 100 can display the spectrum slider element 517 on the client device 502, such as by displaying the spectrum slider element 517 within the generative document editor 504.

As illustrated in FIG. 5, based on receiving an interaction 518 with the spectrum slider element 517 (e.g., such as a swipe, click, or a tap), the generative text editing system 100 can generate a modification prompt 520 to provide to a generative model 523. Indeed, the generative text editing system 100 can determine, based on the interaction 518, a modified composition attribute value 522 for the digital document 508. To continue in the above example where the generative text editing system 100 determines the composition attribute 512 to be direct, and the generative text editing system 100 further determines the composition attribute value to be 8 on a composition attribute spectrum of 0-10, the generative text editing system 100 can determine the interaction 518 (e.g., an indication of an interaction), by determining a sliding interaction with the spectrum slider element 517. Specifically, the generative text editing system 100 can determine that the sliding interaction generates the modified composition attribute value 522 by decreasing the composition attribute value on the composition attribute spectrum from an 8 to a 5.

As shown in FIG. 5, based on determining the modified composition attribute value 522, the generative text editing system 100 can provide the modification prompt 520 to a generative model 523 and can utilize the generative model 523 to generate a document modification 524 for the digital document 508. Indeed, the generative text editing system 100 can generate the modification prompt 520 to instruct the generative model 523 to modify the composition attribute 512 of the digital document 508 according to the modified composition attribute value 522.

To illustrate, continuing in the above example where the generative text editing system 100 determines, based on the interaction 518 with the spectrum slider element 517, that the modified composition attribute value 522 is a 5 (e.g., where the composition attribute spectrum is a range from 0-10), the generative text editing system 100 can generate the modification prompt 520 to instruct the generative model 523 to generate the document modification 524 by decreasing the directness (e.g., composition attribute 512) of the document modification 524 relative to the digital document 508. Indeed, the generative text editing system 100 can generate the document modification 524 by modifying words and/or phrases of the digital document 508 such that an overall style (e.g., the composition attribute 512) of the document modification 524 is more indirect than that of the digital document 508. Further, the generative text editing system 100 can provide the document modification 524 for display on the client device 502.

In some embodiments, the generative model 523 is the same generative model as the generative model 510. In some embodiments, the generative model 523 is a different generative model than the generative model 510. In some embodiments, the generative model 510 and the generative model 523 have a same underlying architecture but the generative text editing system 100 generates the freeform editing prompt to invoke a first set of parameters of the underlying architecture to perform a first functionality (e.g., such as determining or otherwise generating the composition attribute 512, the composition attribute value, and/or the composition attribute spectrum), and the generative text editing system 100 generates the modification prompt to invoke a second set of parameters of the underlying architecture to perform a second functionality (e.g., such as generating the document modification 524 according to the modified composition attribute value 522).

Further, as shown in FIG. 5, the generative text editing system 100 can utilize a content item repository 511 to augment operations of the generative model 510. For example, the generative text editing system 100 can determine a type of the digital document 508 (e.g., such as by determining a type of content contained in the digital document 508, an organizational format of the digital document 508, a layout of the digital document 508, a project associated with the digital document 508, among others). The generative text editing system 100 can identify one or more matching digital documents from the content item repository 511 that have a matching type. The generative text editing system 100 can determine the composition attribute 512, the composition attribute value, and/or the composition attribute spectrum based on comparing the digital document 508 to the one or more matching digital documents.

Similarly, the generative text editing system 100 can utilize the content item repository 511 to augment operations of the generative model 523. For example, the generative text editing system 100 can generate the document modification 524 based on identifying digital documents in the content item repository 511 that have the same composition attribute value as the modified composition attribute value 522.

In some embodiments, the generative text editing system 100 explicitly determines the composition attribute 512 from the content item repository 511, such as by identifying a composition attributes guidelines document in the content item repository 511 and determining the composition attribute 512 according to the composition attributes guidelines document. In some embodiments, the generative text editing system 100 implicitly determines the composition attribute 512 from the content item repository 511, such as by implying the composition attribute 512 according to composition attribute trends that the generative text editing system 100 determines from data of the content item repository 511.

Further, in some embodiments the generative text editing system 100 generates a preview of the document modification 524. Specifically, the generative text editing system 100 can generate the preview of the document modification to include a suggested composition attribute value. To illustrate, based on determining matching and/or similar documents to the digital document 508, the generative text editing system 100 can generate the preview of the document modification 524 to indicate a suggested composition attribute value that corresponds to changes to grammar attributes, tone attributes, formatting, or other aspects of the digital document 508. The generative text editing system 100 can generate the document modification 524 in response to receiving a confirmation of the preview.

In some embodiments, the generative text editing system 100 instructs the generative model 510 and/or the generative model 523 to interface with a document modification tool to identify the composition attribute 512, the composition attribute value, the composition attribute spectrum, and/or the document modification 524. For example, the generative text editing system 100 can instruct the generative model 510 and/or the generative model 523 to interface with a document modification tool by instructing the generative model 510 and/or 523 to interface with a semantic analysis subsystem, a content restructuring engine, a stylistic transformation API, and/or a context-aware rewriting agent, among others. In some embodiments, the generative text editing system 100 instructs the generative model 510 and/or the generative model 523 to interface with the document modification tool by instructing the generative model 510 and/or the generative model 523 to interface with the content item repository 511.

Figure 6:
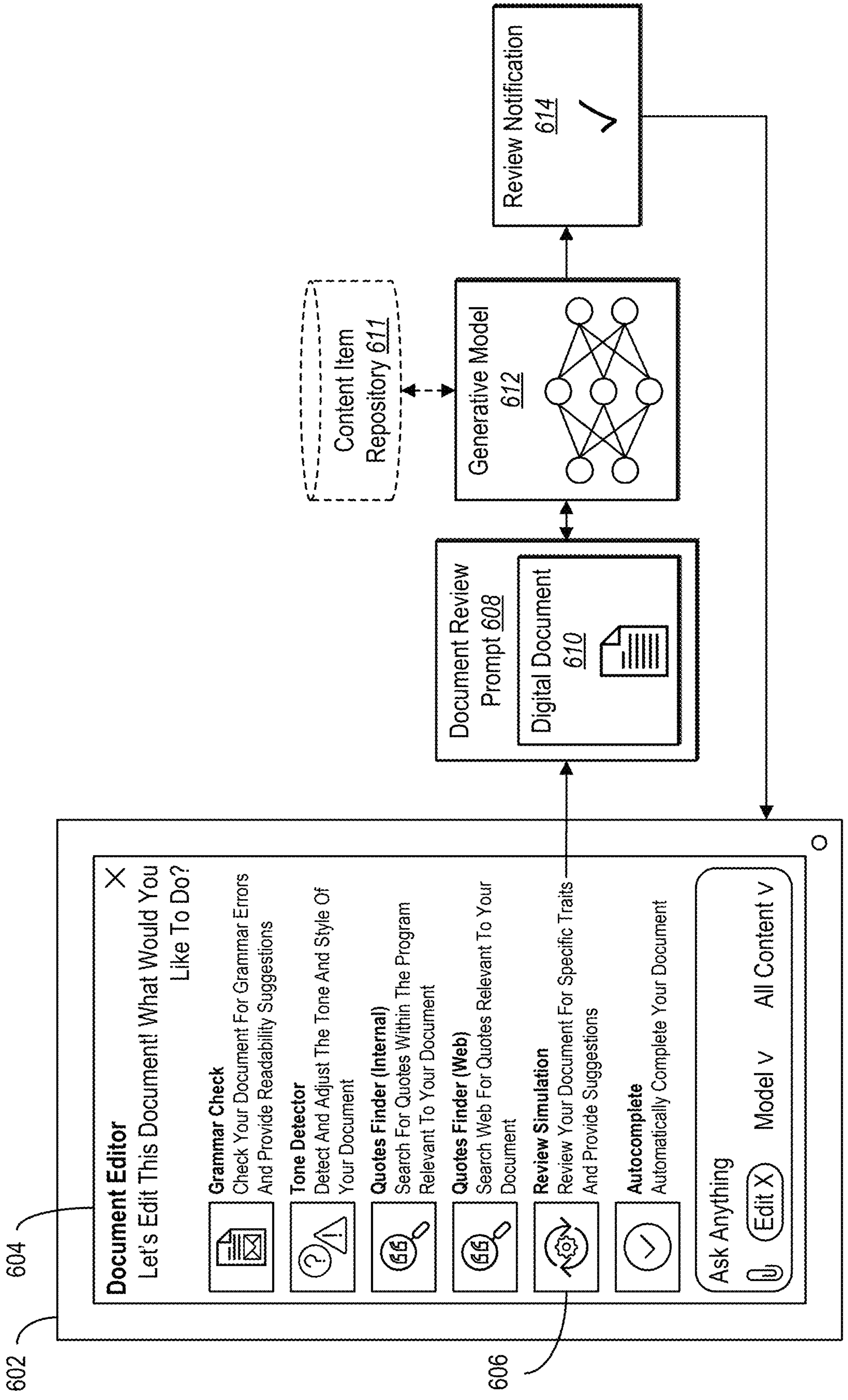
FIG. 6 illustrates an example overview of the generative text editing system instantiating a review simulation pipeline of a generative document editor in response to determining an indication of an interaction with a review simulation pipeline element in accordance with one or more embodiments.

As previously mentioned, the generative text editing system 100 can utilize a review simulation to generate a review notification of a digital document. FIG. 6 illustrates the generative text editing system 100 generating a review notification for a digital document in response to receiving an indication of an interaction with a review simulation pipeline element in accordance with one or more embodiments.

As shown in FIG. 6, the generative text editing system 100 can display a review simulation pipeline element 606 within a generative document editor 604 of a client device 602. As used herein, the term "review simulation pipeline" can refer to a workflow that the generative text editing system 100 implements to simulate a review of a digital document. For example, the generative text editing system 100 can utilize the review simulation pipeline to review one or more aspects (e.g., such as composition attributes) of a digital document. Further, the generative text editing system 100 can instantiate the review simulation pipeline to review a digital document according to one or more review styles of user accounts within a contend management system (e.g., as indicated by review simulation data from the content item repository 611).

As shown in FIG. 6, based on receiving or otherwise determining an indication of an interaction with the review simulation pipeline element 606, the generative text editing system 100 can provide a document review prompt 608 to a generative model 612. As used herein, the term "document review prompt" can refer to a natural language instruction that the generative text editing system 100 generates to identify one or more review styles for a generative model to implement when reviewing a digital document. For example the generative text editing system 100 can generate the document review prompt to indicate a review style and/or a corresponding query account for the generative model to emulate or simulate when reviewing the digital document. Further, the generative text editing system 100 can generate the generative text editing system 100 to indicate a review guidelines document (e.g., from the content item repository 611) for the generative model to utilize when reviewing the digital document.

In some embodiments, the generative text editing system 100 generates the document review prompt 608 based on a document review query that the generative text editing system 100 receives from a user account (e.g., via the generative document editor 604). For example, in some embodiments the generative text editing system 100 can receive a digital document 610 via a chat interface of the generative document editor 604 and can instantiate the review simulation pipeline in response to receiving an indication of an interaction with the review simulation pipeline element 606.

In some embodiments, the generative text editing system 100 instantiates a review simulation interface based on determining the interaction (e.g., the indication of the interaction) with the review simulation pipeline element 606. For example, the generative text editing system 100 can instantiate the review simulation interface by modifying the generative document editor 604 to be the review simulation interface. Further, the generative text editing system 100 can receive a review simulation query via the review simulation interface. The generative text editing system 100 can parse the review simulation query to determine one or more review indicators (e.g., such as indicators of review style and/or a query account that corresponds to the review style, a review guidelines document, and/or other review data) from the review simulation query. Further, the generative text editing system 100 can generate the document review prompt 608 according to the review indicators.

As illustrated in FIG. 6, the generative text editing system 100 can provide the document review prompt to the generative model 612 and can utilize the generative model 612 to generate a review notification 614. As used herein, the term "review notification" can refer to a structured or otherwise defined review simulation that the generative text editing system 100 generates based on reviewing the digital document 610. For example, the generative text editing system 100 can define parameters for the review of the digital document 610 based on the review indicators. In some embodiments, the generative text editing system 100 determines the review indicators from the content item repository 611. The generative text editing system 100 can generate the review notification to include suggested modifications to the digital document 610 according to the review indicators. In some embodiments, the generative text editing system 100 generates the review notification 614 to be natural language text and provides the review notification 614 via the generative document editor 604. In some embodiments, the generative text editing system 100 generates the review notification 614 to be a digital document and can provide the review notification 614 via the generative document editor 604. In some embodiments, the generative text editing system 100 generates the review notification 614 by modifying the digital document 610, such as by adding comments to the digital document 610 that explain modifications to the digital document 610 according to the review indicators.

For example, the generative text editing system 100 can receive, from a user account, a review query that states "Please review this document like my supervisor would." The generative text editing system 100 can utilize the content item repository 611 (and/or a knowledge graph that corresponds to the content item repository 611) to identify the query account (e.g., the supervisor user account) indicated by the query. The generative text editing system 100 can determine the review indicators from the content item repository 611, such as by identifying review data that corresponds to the supervisor user account (e.g., such as by parsing the content item repository 611) to determine edits, such as redline edits, that correspond to the supervisor account, and/or to determine one or more composition attributes (e.g., such as grammar attribute preferences, tone attribute preferences, among others) that correspond to the query user account. Further, the generative text editing system 100 can identify one or more review guidelines documents that correspond to the query account and can generate the review notification 614 according to the review guidelines document.

In some embodiments, the generative text editing system 100 explicitly determines the review indicators from the content item repository 611, such as by identifying a review indicators document from the content item repository 611 and determining the review indicators according to the review indicators document. In some embodiments, the generative text editing system 100 implicitly determines the review indicators from the content item repository 611, such as by identifying review indicator trends from data of the content item repository 611. Further, in some embodiments the generative text editing system 100 determines, from the content item repository 611, a reviewer account template that indicates a particular role or position (e.g., within an organization) for the generative text editing system 100 to emulate when generating the review notification 614.

As shown in FIG. 6, the generative text editing system 100 can provide the review notification 614 for display on the client device 602. In some embodiments the generative text editing system 100 generates a document modification in response to receiving a confirmation (or an indication of a confirmation of) the review notification 614. In some embodiments the generative text editing system 100 receives a modification to the review notification 614 and generates a modified document review prompt to cause a generative model (e.g., such as the generative model 612 or a different generative model) to generate a modified review notification according to the modified document review prompt.

Further, in some embodiments the generative text editing system 100 further instructs the generative model 612 to interface with a document modification tool to generate the review notification 614. For example, the generative text editing system 100 can instruct the generative model 612 to interface with a document modification tool by instructing the generative text editing system 100 to interface with a review-style modeling subsystem, a feedback generation API, a persona simulation agent, and/or a contextual critique engine, among others. In some embodiments, the generative text editing system 100 instructs the generative model 612 to interface with a document modification tool by instructing the generative model 612 to interface with the content item repository 611.

Figure 7:
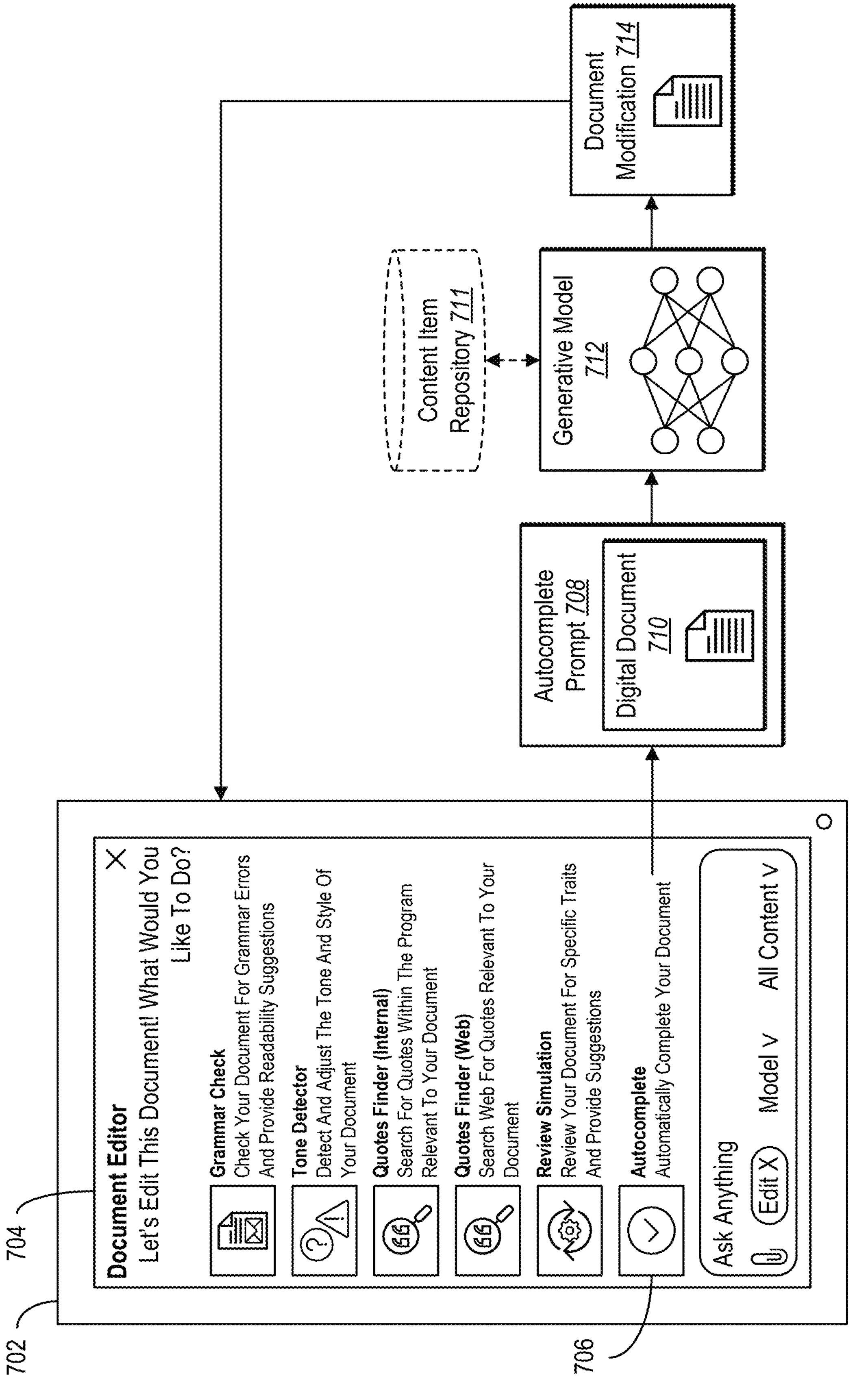
FIG. 7 illustrates an example overview of the generative text editing system instantiating an autonomous completion pipeline of a generative document editor in response to determining an indication of an interaction with an autonomous completion pipeline element in accordance with one or more embodiments.

As previously mentioned, the generative text editing system 100 can utilize an autonomous completion pipeline to generate a document modification. FIG. 7 illustrates the generative text editing system 100 generating a document modification in response to receiving an indication of an interaction with an autonomous completion pipeline element in accordance with one or more embodiments.

As shown in FIG. 7, the generative text editing system 100 can receive, via a generative document editor 704 displayed on a client device 702, an indication of an interaction (e.g., such as a tap, click, or a swipe, among others) with an autonomous completion pipeline element 706. As used herein, the term "autonomous completion pipeline" can refer to a pre-configured document editing pipeline that the generative text editing system 100 utilizes to autonomously complete one or more portions of digital documents. For example the generative text editing system 100 can utilize the autonomous completion pipeline to autonomously complete a portion of a digital document by generating or otherwise suggesting continuations of textual content of the digital document. Further, in some embodiments the generative text editing system 100 utilizes the autonomous completion pipeline to autonomously complete a digital document by applying specific formatting parameters to the digital document.

As shown in FIG. 7, based on determining the indication of the interaction with the autonomous completion pipeline element 706, the generative text editing system 100 can provide an autocomplete prompt 708 to a generative model 712. As used herein, the term "autocomplete prompt" can refer to a natural language instruction that the generative text editing system 100 generates to instruct a generative model to complete one or more portions of a document autonomously (e.g., without additional user interaction or input as part of the content generation process).

Further, the generative text editing system 100 can include a digital document 710 with the autocomplete prompt 708. For example, the generative text editing system 100 can receive the digital document 710 via the generative document editor 704. Moreover, the generative text editing system 100 can autonomously generate the autocomplete prompt 708 based on receiving, via the generative document editor 704, the digital document 710 and determining the indication of the interaction with the autonomous completion pipeline element 706.

In some embodiments, the generative text editing system 100 generates the autocomplete prompt 708 based on receiving an autocomplete query from the client device 702. For example, the generative text editing system 100 can instantiate an autocomplete interface based on determining the indication with the autonomous completion pipeline element 706 (e.g., such as by modifying the generative document editor 704 to be the autocomplete interface). Based on instantiating the autonomous completion pipeline, the generative text editing system 100 can receive an autocomplete query in conjunction with the digital document 710. The generative text editing system 100 can parse the autocomplete query to determine what portions and/or elements of the digital document 710 to complete.

As illustrated in FIG. 7, the generative text editing system 100 can utilize the generative model 712 to generate a document modification 714. In some embodiments, the generative text editing system 100 utilizes a content item repository 711 to generate the document modification 714. For example, the generative text editing system 100 can determine, via the content item repository 711, what elements and/or sections to add to the digital document 710 to generate the document modification 714 and/or how to format the digital document 710 to generate the document modification 714. Indeed, the generative text editing system 100 can generate the document modification 714 by generating or otherwise completing one or more sentences and/or one or more paragraphs of the digital document 710.

As shown in FIG. 7, the generative text editing system 100 can provide the document modification 714 for display on the client device 702. In some embodiments, the generative text editing system 100 can provide a preview of the document modification 714 for display on the client device 702 and can further display the document modification 714 in response to receiving a confirmation of the document preview.

In some embodiments, the generative text editing system 100 instructs the generative model 712 to interface with a document modification tool to generate the document modification 714. For example, the generative text editing system 100 can instruct the generative model 712 to interface with a predictive content generation API, a document pattern recognition subsystem, and/or a content synthesis agent. In some embodiments, the generative text editing system 100 instructs the generative model 712 to interface with a document modification tool by instructing the generative model to interface with the content item repository 711.

In some embodiments, the generative text editing system 100 explicitly determines the document modification 714 from the content item repository 711, such as by identifying an autocomplete guidelines document from the content item repository 711 and generating the document modification 714 according to the autocomplete guidelines document. In some embodiments, the generative text editing system 100 implicitly determines the document modification 714 from the content item repository 711, such as by determining autocompletion trends from data of the content item repository 711 and generating the document modification according to the autocompletion trends.

Further, the generative text editing system 100 can generate the document modification 714 on a per-sentence, per-paragraph, per-section, or per-document basis. Further, in some embodiments the generative text editing system 100 autonomously generates the document modification 714 on the per-sentence, per-paragraph, or per-document basis. For example, the generative text editing system 100 can autonomously generate suggestions to complete sentences, paragraphs, or documents, without detecting an indication of an interaction with the autonomous completion pipeline element 706.

Figure 8A:
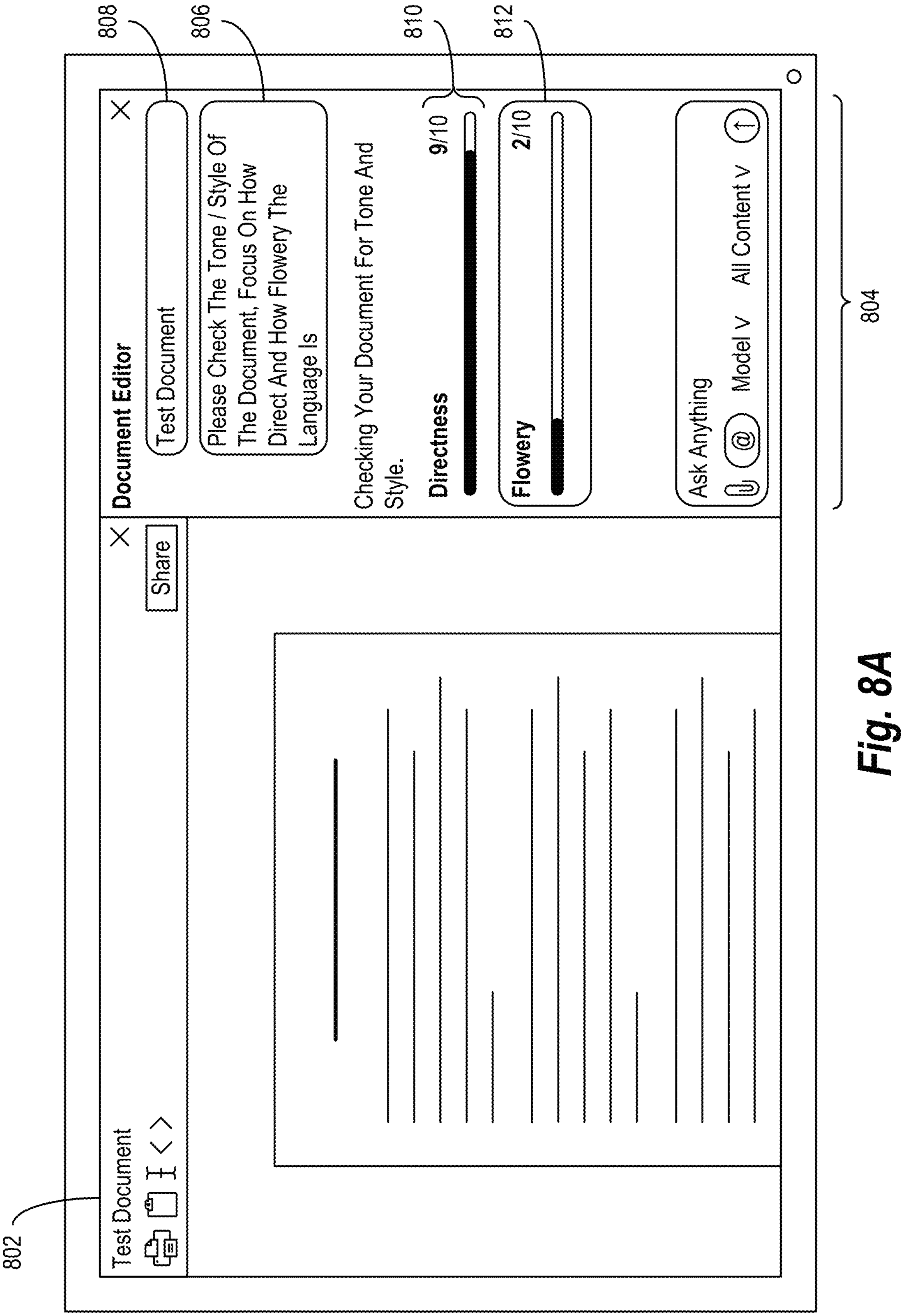
FIGS. 8A-8B illustrate example embodiments of the generative text editing system utilizing a generative document editor to generate a preview of a document modification and modifying the preview of the document modification based on determining an indication of an interaction with a spectrum slider element in accordance with one or more embodiments.
Figure 8B:
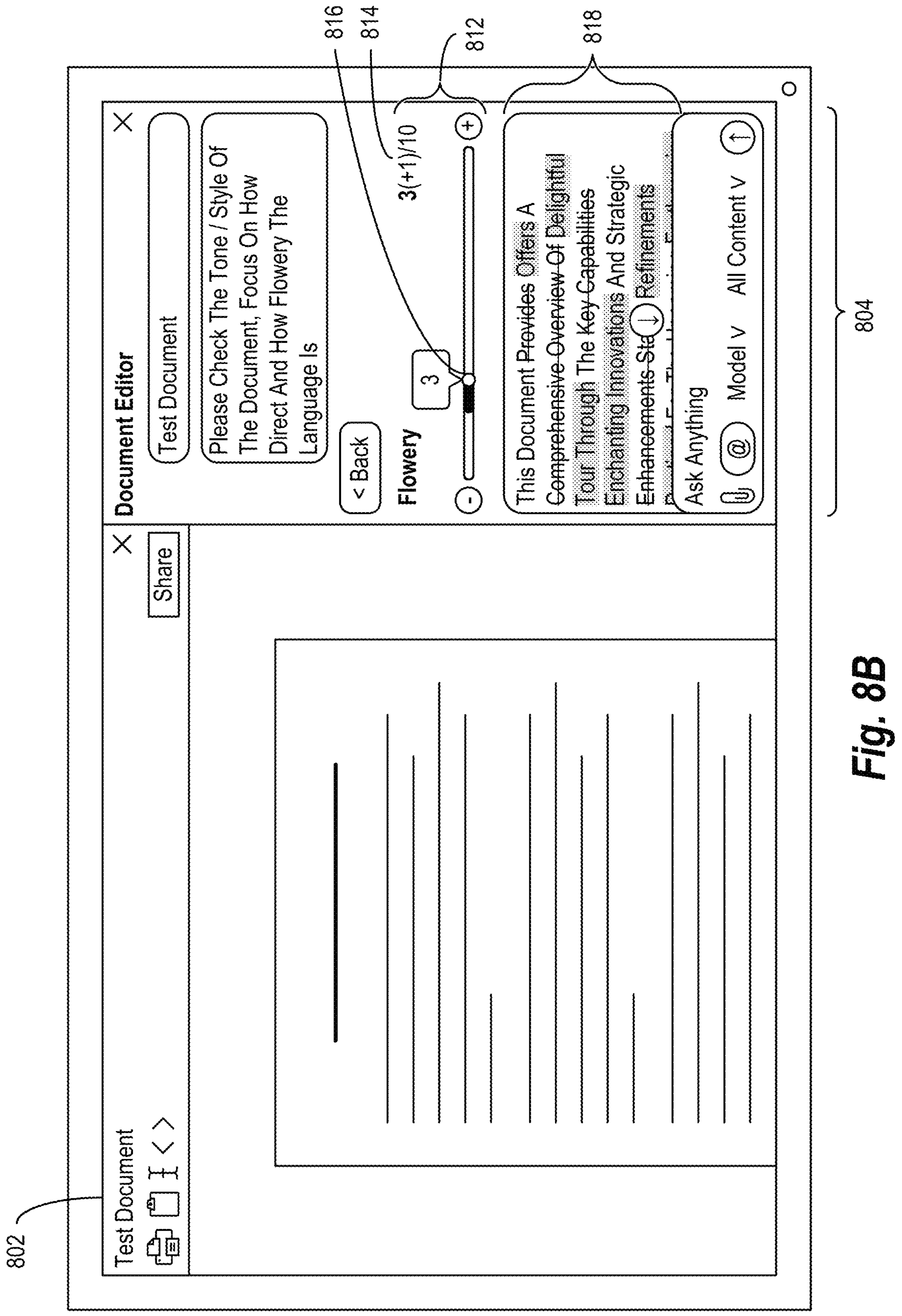

As previously mentioned, the generative text editing system 100 can generate a spectrum slider element to represent a spectrum slider element to represent a composition attribute value on a composition attribute spectrum. FIGS. 8A-8B illustrate the generative text editing system 100 determining a composition attribute, a composition attribute value and a composition attribute spectrum for a digital document, generating a spectrum slider element to represent the composition attribute, composition attribute value, and composition attribute spectrum, and generating a document modification based on determining an indication of an interaction with the spectrum slider element in accordance with one or more embodiments.

As shown in FIG. 8A, the generative text editing system 100 can receive a freeform document editing query 806 (e.g., "Please check the tone/style of the document, focus on how Direct and how Flowery the language is"), and a corresponding digital document 808 via a generative document editor 804 that the generative text editing system 100 displays on a client device 802. For example, the generative text editing system 100 can receive the freeform document editing query 806 and the digital document 808 via a chat interface of the generative document editor 804. Indeed, the generative text editing system 100 can determine to instantiate a freeform document editing pipeline based on receiving a query via the chat interface and parsing the query to determine that the query is a freeform document editing query.

As previously discussed, the generative text editing system 100 can parse the freeform document editing query 806 to determine composition attributes from the freeform document editing query 806. For example, the generative text editing system 100 can parse the freeform document editing query 806 to determine a first composition attribute (e.g., "Direct") and a second composition attribute (e.g., "Flowery"). Based on determining the first and second composition attributes, the generative text editing system 100 can generate a freeform editing prompt and provide the freeform editing prompt along with the digital document 808 to a generative model.

Indeed, the generative text editing system 100 can utilize the generative model to parse the digital document 808 according to the freeform editing prompt to determine a first composition attribute value and a first composition attribute spectrum for the first composition attribute (e.g., the generative text editing system 100 can generate a score for the digital document 808 that indicates how "Direct" language of the digital document 808 is, such as on a scale of 1-10). Further, the generative text editing system 100 can determine a second composition attribute value and a second composition attribute spectrum for the second composition attribute (e.g., the generative text editing system 100 can generate a score for the digital document 808 that indicates how "Flowery" language of the digital document 808 is, such as on a scale of 1-10).

As shown in FIG. 8A, the generative text editing system 100 can generate a first spectrum slider element 810 that corresponds to the first composition attribute (e.g., "Directness"). Indeed, the generative text editing system 100 can generate the first spectrum slider element 810 to represent or otherwise indicate a first composition attribute value on a first composition attribute spectrum (e.g., "Directness 9/10"). Further, the generative text editing system 100 can generate a second spectrum slider element 812 that corresponds to the second composition attribute (e.g., "Flowery"). Moreover, the generative text editing system 100 can generate the second spectrum slider element 812 to represent or otherwise indicate a second composition attribute value on a second composition attribute value spectrum (e.g., "Flowery 2/10").

As shown in FIG. 8B, the generative text editing system 100 can receive or otherwise determine an indication of an interaction 816 (e.g., such as a tap, click, or a swipe) with the second spectrum slider element 812. Based on determining the indication of the interaction 816 with the second spectrum slider element 812, the generative text editing system 100 can determine a modified composition attribute value 814 (e.g., within the composition attribute spectrum, such as 3/10 as opposed to the composition attribute value of 2/10).

Based on determining the modified composition attribute value 814, the generative text editing system 100 can generate a modification prompt to provide to a generative model. Indeed, the generative text editing system 100 can generate the modification prompt to instruct the generative model to generate a document modification according to the modified composition attribute value 814, such as by modifying textual elements of the digital document 808 that correspond to the composition attribute according to the modified composition attribute value 814. Indeed, the generative text editing system 100 can generate the document modification by modifying textual elements that correspond to the composition attribute relative to the modified composition attribute value 814.

For example, where the generative text editing system 100 generates or otherwise determines the modified composition attribute value 814 by increasing the composition attribute value from a 2 to a 3, the generative text editing system 100 can generate the document modification by modifying textual components of the digital document 808 to reflect the difference between the modified composition attribute value 814 (e.g., 3/10) and the composition attribute value (e.g., 2/10). Indeed, the generative text editing system 100 can generate the document modification by modifying the digital document 808 to include relatively more "flowery" language than the generative text editing system 100 originally identifies in the digital document 808.

As shown in FIG. 8B, the generative text editing system 100 can generate and provide a preview 818 of the document modification within the generative document editor 804 of the client device 802. Indeed, the generative text editing system 100 can generate the preview 818 to show changes to textual elements of the digital document 808, such as by generating marked up text (e.g., such as strike-through, highlighting, and/or underlining) that indicates words or phrases that the generative text editing system 100 suggests to remove from the digital document 808 as well as corresponding replacements for the removed textual elements. In some embodiments, the generative text editing system 100 generates the document modification based on receiving an indication of a confirmation of the preview 818 from the client device 802.

In some embodiments, the generative text editing system 100 displays the preview 818 in a portion of the client device 802 other than the generative document editor 804. For example, the generative text editing system 100 can display the preview 818 within a webpage of a web browser or within a document editing application (e.g., such as MICROSOFT WORD).

In some embodiments, the generative text editing system 100 determines or otherwise receives an additional indication of an interaction with the second spectrum slider element 812 and can generate an additional preview in response to determining an additional modified composition attribute value from the additional indication of the interaction. For example, the generative text editing system 100 can iteratively generate document modifications and/or previews of document modifications based on iteratively receiving and/or determining indications of interactions with the second spectrum slider element 812.

Indeed, while FIGS. 8A-8B and their corresponding discussion illustrate the generative text editing system 100 instantiating a freeform document editing pipeline and generating a spectrum slider element to represent composition attributes, composition attribute values, and composition attribute spectrums that the generative text editing system 100 identifies based on receiving a freeform document editing query, the generative text editing system 100 can generate a spectrum slider element to represent a composition attribute, a composition attribute value, and/or a composition attribute spectrum that the generative text editing system 100 determines utilizing any of the workflows of the generative document editor 804. For example, the generative text editing system 100 can generate a spectrum slider element to represent composition attributes, composition attribute values, and/or composition attribute spectrums that the generative text editing system 100 identifies responsive to instantiating a grammar modification pipeline, a tone modification pipeline, an internal quote extraction pipeline, a web-based quote extraction pipeline, a review simulation pipeline, and/or an autonomous completion pipeline.

Additionally, in response to determining an indication of an interaction with a spectrum slider element that the generative text editing system 100 generates to represent composition attributes that correspond to a pre-configured document editing pipeline, the generative text editing system 100 can determine a modified composition attribute value from the interaction and can generate a corresponding prompt to provide to a generative model to instruct the generative model to generate a document modification that reflects the modified composition attribute value. Indeed, in response to determining an interaction with a spectrum slider element, the generative text editing system 100 can generate a document modification that includes modified grammar attributes, modified tone attributes, modified quote insertions, and/or modified review notifications, among others.

Further, as previously discussed, the generative text editing system 100 can utilize a content item repository to augment workflows of the generative document editor 804 (e.g., such as pre-configured document editing pipelines and/or the freeform document editing pipeline). For example, the generative text editing system 100 can extract or otherwise identify data from the content item repository and utilize the data from the content item repository to generate a document modification that is specific to preferences for a user account (e.g., that corresponds to the client device 802), that is specific to preferences for a group of user accounts (e.g., such as user accounts that are team members and/or supervisors of the user account), or that is specific to specific policies or preferences within a content management system.

Moreover, in some embodiments the generative text editing system 100 constructs a knowledge graph from the content item repository (and/or from other data sources within the content management system). For example, the generative text editing system 100 can generate the knowledge graph to include primary nodes that correspond to user accounts within the content management system and secondary nodes that correspond to content items within the content management system. The generative text editing system 100 can generate a first set of edges that interconnect primary nodes of the knowledge graph and that thus represent relationships between the user accounts. Further, the generative text editing system 100 can generate a second set of edges that interconnect secondary nodes of the knowledge graph and that thus represent relationships between content items in the content management system. Moreover, the generative text editing system 100 can generate a third set of edges that interconnect primary nodes and secondary nodes of the knowledge graph and that thus represent relationships between user accounts and content items in the content management system.

Accordingly, when instantiating a pipeline (e.g., such as a pre-configured document editing pipeline and/or a freeform document editing pipeline), the generative text editing system 100 can generate a knowledge graph augmentation prompt and provide the knowledge graph augmentation prompt to a generative model to instruct the generative model to augment the document modification with data from the knowledge graph. For example, the generative text editing system 100 can use the generative model to identify primary and secondary nodes within a threshold distance of a secondary node that corresponds to a digital document that the generative text editing system 100 receives (e.g., via the generative document editor 804). The generative text editing system 100 can utilize data from the primary and secondary nodes within the threshold distance of the secondary node to generate the document modification.

In some embodiments, when the generative text editing system 100 generates a document modification in response to determining a modified composition attribute value, the generative text editing system 100 determines a second modified composition attribute value that corresponds to a second composition attribute of the digital document 808. Accordingly, the generative text editing system 100 can modify a spectrum slider element that corresponds to the second modified composition attribute. Further, the generative text editing system 100 can generate and provide an explanation for the second modified composition attribute value. In some embodiments, the generative text editing system 100 can instruct the generative model to generate the document modification according to the modified composition attribute value without modifying elements of the digital document 808 that would result in the generative text editing system 100 determining a second modified composition attribute value. To illustrate, the generative text editing system 100 can hold or otherwise maintain a constant composition attribute value (e.g., by not modifying elements of the digital document 808 that correspond to the constant composition attribute value) when generating a document modification based on determining a modified composition attribute value for a composition attribute that is different from the constant composition attribute value. Indeed, the generative text editing system 100 can utilize the generative model to modify elements of the digital document 808 that correspond to a first composition attribute value, agnostic to modifying elements of the digital document 808 that correspond to additional composition attribute values.

Further, the generative text editing system 100 can train one or more generative models to be deterministic generative models that consistently produce identical outputs from identical or statistically similar inputs. In other words, the generative text editing system 100 can implement deterministic architecture in generative models to cause the generative models to generate deterministic outputs. For example, the generative text editing system 100 can construct or otherwise modify a generative model to include a decoding architecture that applies fixed token-selection logic (e.g., such as greedy decoding or beam search with a constant beam width) to eliminate stochastic sampling variation from workflows of the generative model. Further, in some embodiments the generative text editing system 100 configures a generative model to execute using fixed randomization parameters, such as predetermined random seeds or disabled stochastic operations, thereby ensuring reproducibility of token prediction across inference cycles. Further, the generative text editing system 100 can implement deterministic computation conditions in the generative model by controlling floating point precision, synchronizing generative model execution threads and standardizing computational libraries or hardware execution modes for the generative model. Further, the generative text editing system 100 can fix model weight parameters, tokenizer configurations, and/or vocabular schemas to ensure that identical or statistically equivalent inputs yield identical token probability distributions, and therefore identical outputs (e.g., document modifications).

Moreover, the generative text editing system 100 can implement deterministic prompt engineering to utilize the generative model to generate deterministic outputs. For example, when the generative text editing system 100 generates a prompt to provide to a generative model, the generative text editing system 100 can employ fixed prompt templates and standardized input normalization to ensure that equivalent document modification requests result in identical tokenized representations. Further, the generative text editing system 100 can implement deterministic prompt generation logic to arrange instructional text, contextual information, and document content according to a predefined schema.

For example, as discussed above, the generative text editing system 100 can generate various prompts to provide to one or more generative models to instruct the one or more generative model to generate one or more types of document modifications. In some embodiments, the generative text editing system 100 implements a prompt generator model to generate a document editing pipeline-specific prompt in response to determining an indication of an interaction with a document editing pipeline element.

Indeed, the generative text editing system 100 can utilize the prompt generator model to generate a grammar analysis prompt in response to determining an indication of an interaction with a grammar modification pipeline element via the generative document editor 804. Further, the generative text editing system 100 can utilize the prompt generator model to generate a tone prompt in response to determining an indication of an interaction with a tone modification pipeline element. Moreover, the generative text editing system 100 can utilize the prompt generator model to generate a quote extraction prompt in response to determining an indication of an interaction with a quote extraction pipeline element (e.g., such as an internal quote extraction pipeline element and/or a web-based quote extraction pipeline element).

Additionally, the generative text editing system 100 can utilize the prompt generator model to generate a freeform document editing query in response to determining an indication of an interaction with a chat interface of the generative document editor 804. Furthermore, the generative text editing system 100 can utilize the prompt generator model to generate a document review prompt in response to determining an indication of an interaction with a review simulation pipeline element. In addition, the generative text editing system 100 can utilize the prompt generator model to generate an autocomplete prompt in response to determining an indication of an interaction with an autonomous completion pipeline element. Further, the generative text editing system 100 can utilize the prompt generator model to generate modification prompts, such as in response to determining an indication of an interaction with a spectrum slider element within the generative document editor 804.

As discussed above with regard to FIGS. 1-8B, in some embodiments the generative text editing system 100 instantiates a document editing pipeline in response to determining an indication of an interaction with a corresponding document editing pipeline element. In some embodiments, the generative text editing system 100 autonomously determines to instantiate a document editing pipeline based on determining that a user account is interacting with a digital document. For example, the generative text editing system 100 can autonomously determine to instantiate elements of the grammar modification pipeline, the tone modification pipeline, quote extraction pipeline (e.g., such as the internal quote extraction pipeline and/or the web-based quote extraction pipeline), the review simulation pipeline, the autocomplete pipeline, and/or the freeform editing pipeline. For example, the generative text editing system 100 can determine one or more types of modifications made by a user account to the digital document, such as by determining a modification type confidence score. The generative text editing system 100 can compare the modification type confidence score to a confidence threshold. Based on determining that the modification type confidence score meets the confidence threshold, the generative text editing system 100 can autonomously instantiate elements of one or more document editing pipelines to generate modification suggestions for the digital document.

FIGS. 1-8B, the corresponding text, and the examples provide a number of different systems and methods for utilizing document editing pipelines to generate a document modification for a digital document. In addition to the foregoing, implementations can also be described in terms of flowcharts comprising acts or steps in a method for accomplishing a particular result. For example, FIG. 9 illustrates an example series of acts for generating a document modification in accordance with one or more embodiments.

Figure 9:
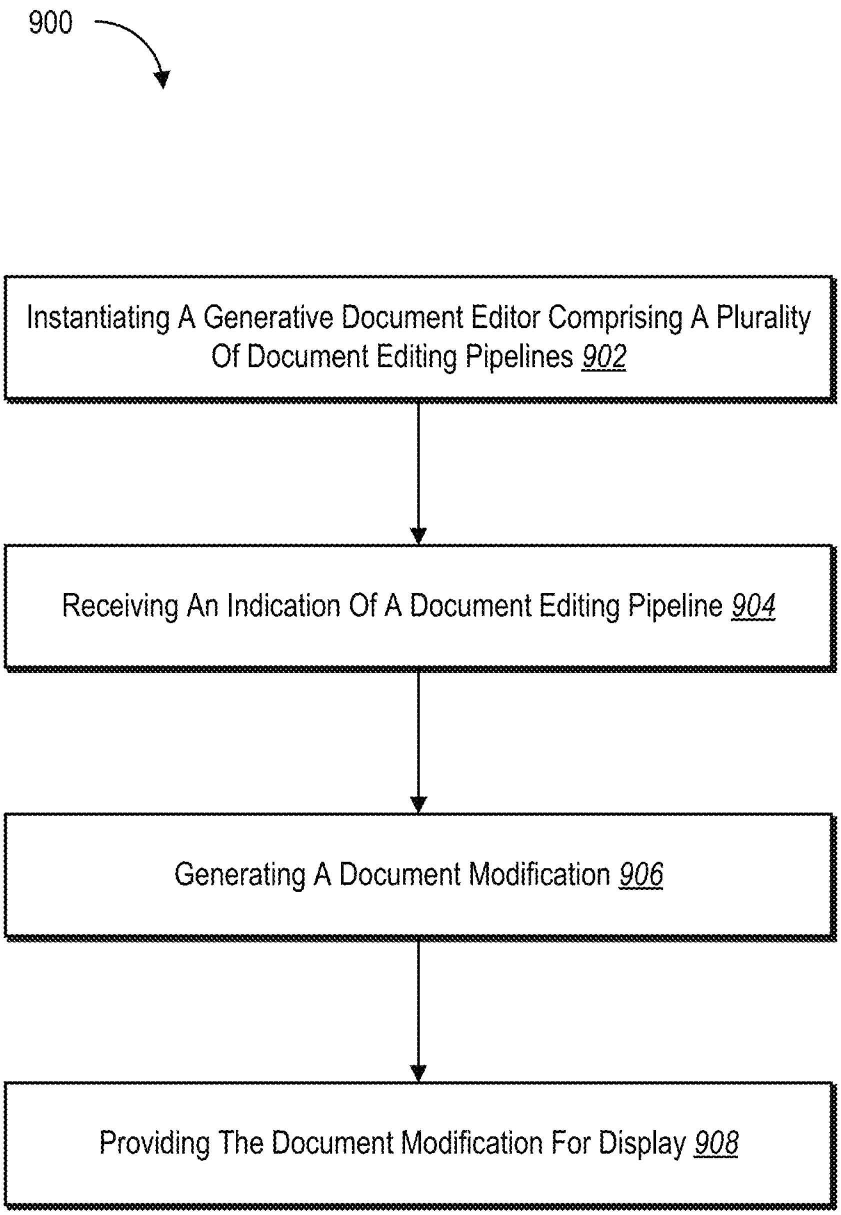
FIG. 9 illustrates an example series of acts for instantiating a document editing pipeline via a generative document editor in accordance with one or more embodiments.

While FIG. 9 illustrates acts according to certain implementations, alternative implementations may omit, add to, reorder and/or modify any of the acts shown in FIG. 9. The acts of FIG. 9 can be performed as part of a computer-implemented method. Alternatively, a non-transitory computer readable medium can comprise instructions (e.g., stored thereon), that when executed by one or more processors, cause a computing device to perform the acts of FIG. 9. In still further implementations, a system can perform the acts of FIG. 9.

As shown in FIG. 9, the series of acts 900 can include an act 902 of instantiating a generative document editor comprising a plurality of document editing pipelines. Specifically, the act 902 can include instantiating, based on an indication from a client device associated with a user account of a content management system, a generative document editor comprising a plurality of pre-configured document editing pipelines and a freeform document editing pipeline each executed by a generative model interacting with respective document modification tools.

Additionally, the series of acts 900 can include an act 904 of receiving an indication of a document editing pipeline. Specifically, the act 904 can include receiving, from the client device, an indication of a document editing pipeline from among the plurality of pre-configured document editing pipelines and the freeform document editing pipeline to use in modifying a digital document.

Moreover, the series of acts 900 can include an act 906 of generating a document modification. Specifically, the act 906 can include generating, based on the indication of the document editing pipeline, a document modification for the digital document by processing digital content stored for the user account within the content management system using the generative model to interface with a document modification tool corresponding to the document editing pipeline.

Furthermore, the series of acts 900 can include an act 908 of providing the document modification for display. Specifically, the act 908 can include providing the document modification for display on the client device.

For example, the series of acts 900 can include acts to perform any of the operations described in the following clauses:

CLAUSE 1. A method comprising:

instantiating, based on an indication from a client device associated with a user account of a content management system, a generative document editor comprising a plurality of pre-configured document editing pipelines and a freeform document editing pipeline each executed by a generative model interacting with respective document modification tools;

receiving, from the client device, an indication of a document editing pipeline from among the plurality of pre-configured document editing pipelines and the freeform document editing pipeline to use in modifying a digital document;

generating, based on the indication of the document editing pipeline, a document modification for the digital document by processing digital content stored for the user account within the content management system using the generative model to interface with a document modification tool corresponding to the document editing pipeline; and providing the document modification for display on the client device.

CLAUSE 2. The method of clause 1, wherein receiving the indication of the document editing pipeline comprises receiving the indication of the freeform document editing pipeline by receiving a freeform document editing query that describes a modification to the digital document.

CLAUSE 3. The method of any of clauses 1-2, further comprising: determining, by the generative model, a composition attribute value for the digital document; and providing, for display as part of a graphical user interface presenting the generative document editor, a composition attribute spectrum indicating the composition attribute value.

CLAUSE 4. The method of any of clauses 1-3, further comprising:

generating, for display as part of the composition attribute spectrum of the generative document editor, a spectrum slider element slidable to adjust the composition attribute value along the composition attribute spectrum;

determining, based on receiving an interaction sliding the spectrum slider element, a modification prompt indicating a modified composition attribute value; and generating the document modification by using the generative model to process the modification prompt indicating the modified composition attribute value.

CLAUSE 5. The method of any of clauses 1-4, wherein generating the document modification comprises:

generating a grammar analysis prompt based on receiving an interaction with a grammar modification pipeline of the plurality of pre-configured document editing pipelines; generating, based on providing the grammar analysis prompt to the generative model, a preview of the document modification utilizing the generative model to apply a grammar analysis tool to the digital document; and applying the document modification to the digital document based on receiving a confirmation of the preview from the client device.

CLAUSE 6. The method of any of clauses 1-5, further comprising:

generating, based on the indication of the document editing pipeline, a plurality of spectrum slider elements for display on the client device;

generating a preview of the document modification by modifying a composition attribute of the digital document using the generative model based on receiving an interaction with a spectrum slider element of the plurality of spectrum slider elements; and applying the document modification to the digital document based on receiving a confirmation of the preview from the client device.

CLAUSE 7. The method of any of clause 1-6, further comprising:

generating, for display on the client device based on receiving an indication selecting a tone modification pipeline from the plurality of pre-configured document editing pipelines, a plurality of tone slider elements selectable to modify respective tone attributes of the digital document;

determining, based on receiving an interaction with a tone slider element of the plurality of tone slider elements, a tone modification prompt for modifying a tone the digital document; and generating, utilizing the generative model to process the tone modification prompt, the document modification according to the tone modification prompt.

CLAUSE 8. The method of any of clauses 1-7, further comprising:

generating, based on receiving an interaction with a quote extraction pipeline of the plurality of pre-configured document editing pipelines, a quote extraction prompt instructing the generative model to extract quotes from content items stored at the content management system; and extracting a quote from a content item stored at the content management system by using the generative model to process the quote extraction prompt.

CLAUSE 9. The method of any of clauses 1-8, further comprising:

generating, based on receiving an interaction with a review simulation pipeline of the plurality of pre-configured document editing pipelines, a document review prompt instructing the generative model to review the digital document based on historical interactions of a user account within the content management system; and generating a review notification for display within the digital document by using the generative model to process the document review prompt.

CLAUSE 10. The method of any of clauses 1-9, wherein generating the document modification comprises generating, using the generative model, a completed version of the digital document based on receiving an interaction with an autonomous completion pipeline of the plurality of pre-configured document editing pipelines.

CLAUSE 11. A method, comprising:

instantiating, based on an indication from a client device associated with a user account of a content management system, a generative document editor comprising a plurality of pre-configured document editing pipelines and a freeform document editing pipeline each executed by a generative model interacting with respective document modification tools;

receiving, from the client device, an indication of a document editing pipeline from among the plurality of pre-configured document editing pipelines and the freeform document editing pipeline to use in modifying a digital document;

based on receiving the indication of the document editing pipeline, determine a composition attribute of the digital document to modify;

generate, based on determining a composition attribute of the digital document to modify, a document modification for the digital document by processing digital content stored for the user account within the content management system using the generative model to interface with a document modification tool corresponding to the document editing pipeline; and providing the document modification for display on the client device.

CLAUSE 12. The method of clause 11, further comprising receiving the indication of the document editing pipeline by receiving a freeform document editing query that describes a modification to the digital document.

CLAUSE 13. The method of any of clauses 11-12 further comprising:

determining, by the generative model, a composition attribute value for the composition attribute of the digital document; and providing, for display as part of a graphical user interface presenting the generative document editor, a composition attribute spectrum indicating the composition attribute value.

CLAUSE 14. The method of any of clauses 11-13, further comprising:

generating, for display as part of the composition attribute spectrum of the generative document editor, a spectrum slider element slidable to adjust the composition attribute value along the composition attribute spectrum;

determining, based on receiving an interaction sliding the spectrum slider element, a modification prompt indicating a modified composition attribute value; and generating the document modification by using the generative model to process the modification prompt indicating the modified composition attribute value.

CLAUSE 15. The method of any of clauses 11-14, further comprising:

generating, based on receiving an interaction with a quote extraction pipeline of the plurality of pre-configured document editing pipelines, a quote extraction prompt instructing the generative model to extract quotes from one or more webpages of a web browser; and extracting a quote from a webpage of the one or more webpages by using generative model to process the quote extraction prompt.

CLAUSE 16. A method, comprising:

instantiating, based on an indication from a client device associated with a user account of a content management system, a generative document editor comprising a plurality of pre-configured document editing pipelines and a freeform document editing pipeline each executed by a generative model interacting with respective document modification tools;

receiving, from the client device, an indication of a document editing pipeline from among the plurality of pre-configured document editing pipelines and the freeform document editing pipeline to use in modifying a digital document;

generating, based on the indication of the document editing pipeline, a document modification for the digital document by processing digital content stored for the user account within the content management system using the generative model to interface with a document modification tool corresponding to the document editing pipeline and further using the generative model to interface with a content item repository to augment the document modification; and providing the document modification for display on the client device.

CLAUSE 17. The system of clause 16, further comprising receiving the indication of the document editing pipeline by receiving a freeform document editing query that describes a modification to the digital document.

CLAUSE 18. The system of any of clauses 16-17, further comprising:

determining, by the generative model, a composition attribute value for the composition attribute of the digital document according to data from the content item repository; and providing, for display as part of a graphical user interface presenting the generative document editor, a composition attribute spectrum indicating the composition attribute value.

CLAUSE 19. The system of any of clauses 16-18, further comprising:

generating, for display as part of the composition attribute spectrum of the generative document editor, a spectrum slider element slidable to adjust the composition attribute value along the composition attribute spectrum;

determining, based on receiving an interaction sliding the spectrum slider element, a modification prompt indicating a modified composition attribute value; and generating the document modification by using the generative model to process the modification prompt indicating the modified composition attribute value.

CLAUSE 20. The system of any of clauses 16-19, further comprising:

generating, based on receiving an interaction with a review simulation pipeline of the plurality of pre-configured document editing pipelines, a document review prompt instructing the generative model to review the digital document based on historical interactions of a user account within the content management system; and generating a review notification for display within the digital document by using the generative model to process the document review prompt.

Additional description will now be provided for terms utilized to described various functions and operations of the generative text editing system 100. As used herein, the term "large language model" (or "LLM") refers to a computational model configured to process and generate human-readable text by learning statistical and contextual relationships within natural language data using machine learning techniques. An LLM typically comprises a deep neural network architecture, such as a transformer-based architecture with multiple layers and attention mechanisms and is trained on large corpora of text using objectives such as masked language modeling, causal language modeling, or autoregressive prediction. The LLM may include billions or trillions of parameters and is capable of performing a variety of language tasks, including but not limited to text generation, summarization, translation, and question answering, by generating outputs based on input prompts in a contextually relevant manner.

Relatedly, the term "machine learning model" refers to a computational construct comprising one or more algorithms and associated parameters that are configured to perform tasks by identifying patterns or relationships within data. A machine learning model may be trained using supervised, unsupervised, semi-supervised, or reinforcement learning techniques, where the model parameters are adjusted based on input data to minimize a loss function or maximize a reward signal. The machine learning model may include, but is not limited to, neural networks (e.g., convolutional neural networks, recurrent neural networks, transformer models), decision trees, support vector machines, or ensemble models, and may be configured to perform tasks such as classification, regression, clustering, anomaly detection, or data generation. A machine learning model may operate on structured, unstructured, or multimodal data and may generate outputs that are used for predictions, decisions, or content generation based on learned representations of input data.

Additionally, the term "neural network" refers to a computational model comprising multiple interconnected processing elements, often referred to as neurons or nodes, that are organized into layers including an input layer, one or more hidden layers, and an output layer. Each neuron in the neural network applies a transformation, which may include a weighted sum of inputs followed by a non-linear activation function, to produce an output that is transmitted to subsequent neurons in the network. Neural networks are configured to learn representations of data by adjusting the weights and biases of the connections between neurons during a training process that minimizes a loss function. The neural network may include various architectures, including but not limited to feedforward neural networks, convolutional neural networks (CNNs), recurrent neural networks (RNNs), and transformer-based networks (e.g., LLMs), and may be utilized for tasks such as classification, regression, pattern recognition, natural language processing, and generative modeling across structured, unstructured, or multimodal data.

Figure 10:
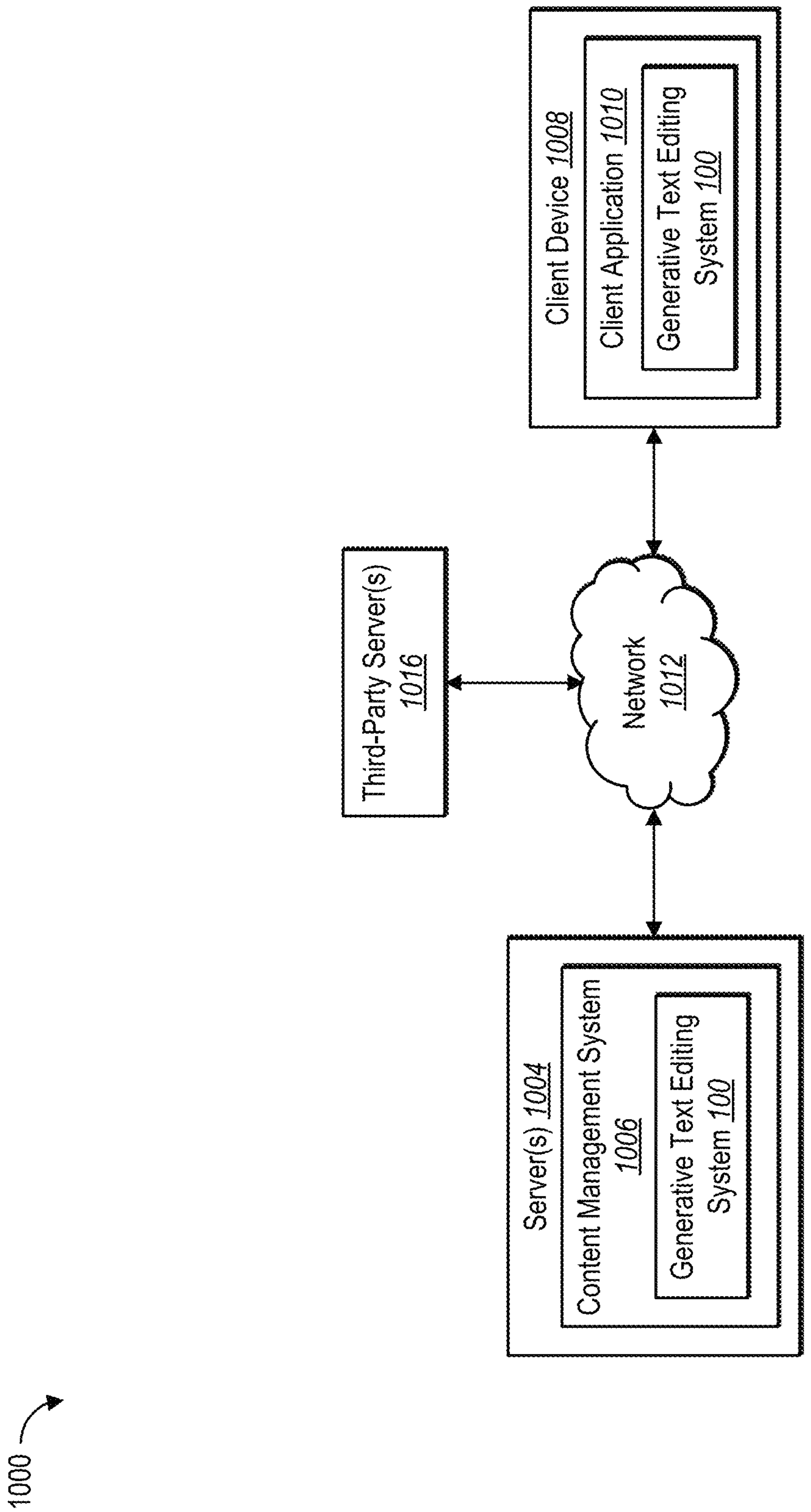
FIG. 10 illustrates a schematic diagram of an example environment of the generative text editing system in accordance with some embodiments.

Additional detail regarding the generative text editing system will now be provided with reference to the figures. For example, FIG. 10 illustrates a schematic diagram of an example system environment 1000 for implementing a generative text editing system 100 in accordance with one or more implementations.

As shown, the environment 1000 includes server(s) 1004, a client device 1008 (e.g., the client devices described herein), third-party servers 1016 and a network 1012. Each of the components of the environment 1000 can communicate via the network 1012, and the network 1012 may be any suitable network over which computing devices can communicate. Example networks are discussed in more detail below in relation to FIGS. 11-12.

As mentioned above the example environment 1000 includes a client device 1008. The client device 1008 can be one of a variety of computing devices, including a smartphone, a tablet, a smart television, a desktop computer, a laptop computer, a virtual reality device, an augmented reality device, or another computing device as described in relation to FIGS. 11-12. The client device 1008 can communicate with the server(s) 1004 via the network 1012. For example, the client device 1008 can receive user input from a user interacting with the client device 1008 (e.g., via a client application 1010) to, for instance, select or otherwise indicate a preconfigured document editing pipeline via a pre-configured document editing pipeline element that the generative text editing system 100 displays via a generative document editor and/or to select or otherwise indicate a freeform document editing pipeline based on determining an indication of an interaction with a chat interface of the generative document editor based on the input received by the client device 1008.

As shown, the client device can include a client application 1010. In particular, the client application 1010 may be a web application, a native application installed on the client device 1008 (e.g., a mobile application, a desktop application, etc.), or a cloud-based application where all or part of the functionality performed by the server(s) 1004. Based on instructions from the client application 1010, the client device 1008 can present or display information, including a preview of a document modification, a document modification, and/or a spectrum slider element.

As illustrated in FIG. 10, the example environment 1000 also includes the server(s) 1004. The server(s) 1004 may generate, track, store, process, receive, and transmit electronic data, such as digital content (e.g., digital documents), LLMs, generative models, prompts for LLMs and/or generative models, agentic subsystems, document modifications, and/or interactions between user accounts on client devices. In addition, the server(s) 1004 can transmit data to the client device in the form of outputs of document modifications, notifications corresponding to document modifications (e.g., such as previews of document modifications), data from a content item repository, among others. Indeed, the server(s) 1004 can communicate with the client device 1008 to send and/or receive data via the network 1012. In some implementations, the server(s) 1004 include(s) a number of server devices distributed across the network 1012 and located in different physical locations. The server(s) 1004 can comprise one or more content servers, application servers, communication servers, web-hosting servers, machine learnings servers, and other types of servers.

As shown in FIG. 10, the server(s) 1004 can also include the generative text editing system 100 as part of the content management system 1006. The content management system 1006 can communicate with the client device 1008 to perform various functions associated with the client application 1010 such as managing user accounts, generating document modifications, generating previews of document modifications, among others. Indeed, the content management system 1006 can include a network-based smart cloud storage system to manage, store, and maintain content items, models, and related data across numerous user accounts, including user accounts in collaboration with one another.

Additionally, as shown in FIG. 10, the example environment 1000 includes third-party server(s) 1016. The third-party server(s) 1016 may generate, track, store, process, receive, and transmit electronic data, such as digital content (e.g., content items and/or digital documents), prompts for LLMs and/or generative models (e.g., responsive to a selection of document editing pipeline element and/or receiving a query via a chat interface of a generative document editor), content of webpages, and/or interactions between user accounts or client devices. In addition, the third-party server(s) 1016 can transmit data to the client device 1008 such as digital documents, queries to generative models, document modifications, interactions between user accounts or client devices. Indeed, the third-party server(s) 1016 can communicate with the client device 1008 to send and/or receive data via the network 1012. The third-party server(s) 1016 can comprise one or more content servers, application servers, communication servers, web-hosting servers, machine learning servers, and other types of servers. In some embodiments, the generative text editing system 100 can interface with the third-party servers 1016 to access, store, modify, or otherwise interact with content items.

Although FIG. 10 depicts the generative text editing system 100 located on the server(s) 1004, in some implementations, the generative text editing system 100 may be implemented by (e.g., located entirely on or in part on) one or more other components of the environment 1000. For example, the generative text editing system 100 may be implemented by the client device 1008 and/or a third-party device. For example, the client device 1008 can download all or part of the generative text editing system 100 for implementation independent of, or together with, the server(s) 1004 and/or third-party server(s) 1016. Moreover, in some implementations, the generative text editing system 100 may solely generate a single scrollable page within a scroll navigation interface.

In some implementations, though not illustrated in FIG. 10, the environment 1000 may have a different arrangement of components and/or may have a different number or set of components altogether. For example, the client device 1008 may communicate directly with the generative text editing system 100, bypassing the network 1012. As another example, the environment 1000 can include a database located external to the server(s) 1004 (e.g., in communication via the network 1012) or located on the server(s), on a third-party system, and/or on the client device 1008.

The components of the generative text editing system 100 can include software, hardware, or both. For example, the components of the generative text editing system 100 can include one or more instructions stored on a computer-readable storage medium executable by processors of one or more computing devices. When executed by one or more processors, the computer-executable instructions of the generative text editing system 100 can cause a computing device to perform the methods described herein. Alternatively, the components of the generative text editing system 100 can comprise hardware, such as a special processing device to perform a certain function or group of functions. Additionally or alternatively, the components of the generative text editing system 100 can include a combination of computer-executable instructions and hardware.

Furthermore, the components of the generative text editing system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the generative text editing system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
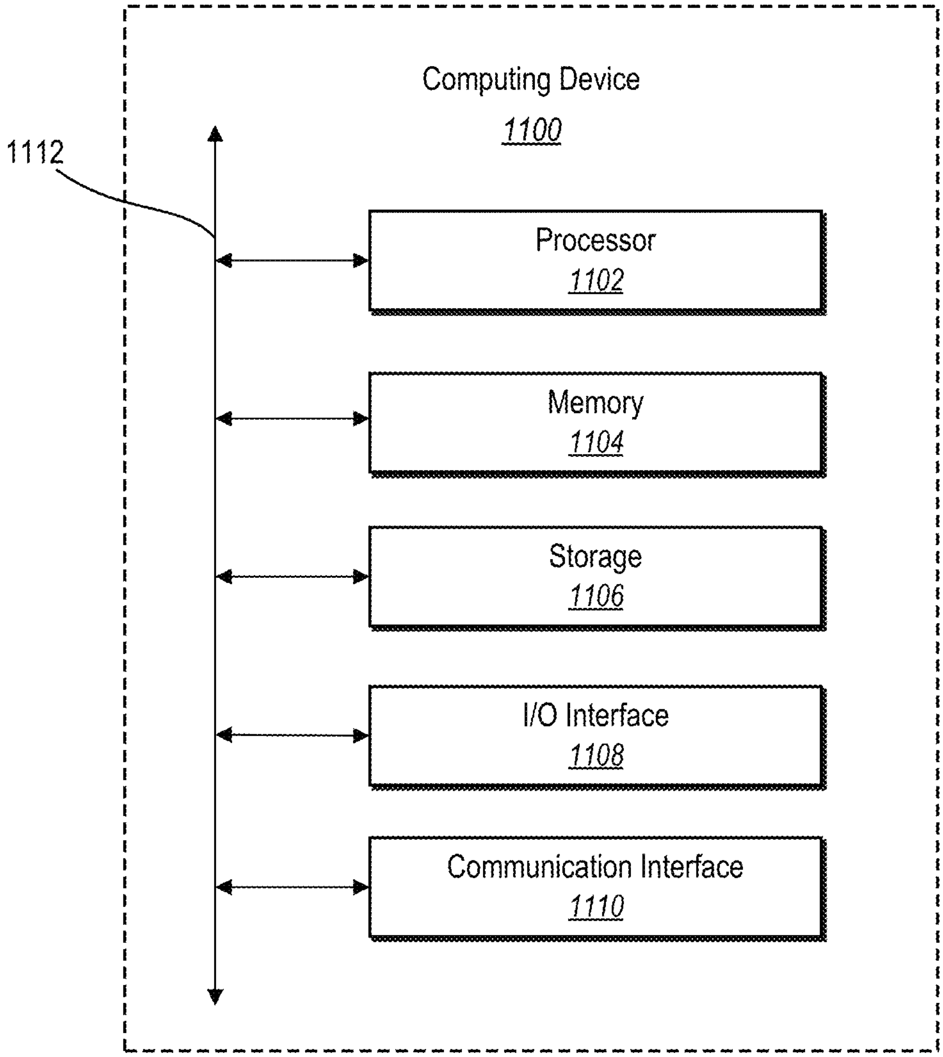
FIG. 11 illustrates a block diagram of a computing device for implementing one or more embodiments of the generative text editing system.

FIG. 11 illustrates a block diagram of exemplary computing device 1100 (e.g., the server(s) 1004 and/or the client device 1008) that may be configured to perform one or more of the processes described above in accordance with one or more implementations. One will appreciate that server(s) 1004 and/or the client device 1008 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 12:
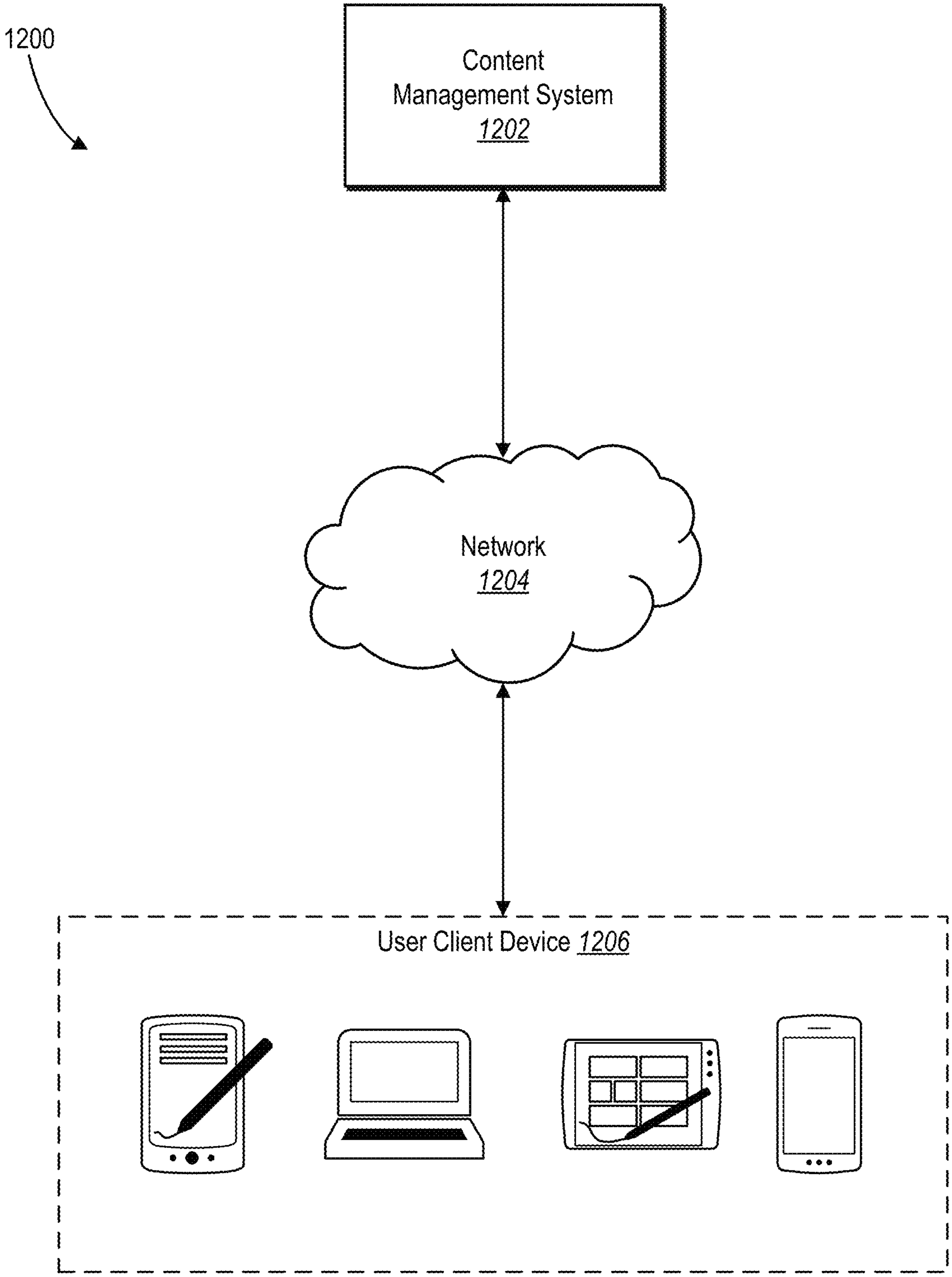
FIG. 12 illustrates an example environment of a content management system having the generative text editing system in accordance with one or more embodiments.

FIG. 12 is a schematic diagram illustrating environment 1200 within which one or more implementations of the generative text editing system 100 can be implemented. For example, the generative text editing system 100 may be part of a content management system 1202 (e.g., the content management system 1202). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

instantiating, based on an indication from a client device associated with a user account of a content management system, a generative document editor comprising a plurality of pre-configured document editing pipelines and a freeform document editing pipeline each executed by a generative model interacting with respective document modification tools;

receiving, from the client device, an indication of a document editing pipeline from among the plurality of pre-configured document editing pipelines and the freeform document editing pipeline to use in modifying a digital document;

generating, based on the indication of the document editing pipeline, a document modification for the digital document by:

processing digital content stored for the user account within the content management system to determine document modification preferences for the user account; and generating the document modification according to the document modification preferences for the user account by using the generative model to interface with a document modification tool corresponding to the document editing pipeline; and providing the document modification for display on the client device.

2. The method of claim 1, wherein receiving the indication of the document editing pipeline comprises receiving the indication of the freeform document editing pipeline by receiving a freeform document editing query that describes a modification to the digital document.

3. The method of claim 1, further comprising:

determining, by the generative model, a composition attribute value for the digital document; and providing, for display as part of a graphical user interface presenting the generative document editor, a composition attribute spectrum indicating the composition attribute value.

4. The method of claim 3, further comprising:

generating, for display as part of the composition attribute spectrum of the generative document editor, a spectrum slider element slidable to adjust the composition attribute value along the composition attribute spectrum;

determining, based on receiving an interaction sliding the spectrum slider element, a modification prompt indicating a modified composition attribute value; and generating the document modification by using the generative model to process the modification prompt indicating the modified composition attribute value.

5. The method of claim 1, wherein generating the document modification comprises:

generating a grammar analysis prompt based on receiving an interaction with a grammar modification pipeline of the plurality of pre-configured document editing pipelines;

generating, based on providing the grammar analysis prompt to the generative model, a preview of the document modification utilizing the generative model to apply a grammar analysis tool to the digital document; and applying the document modification to the digital document based on receiving a confirmation of the preview from the client device.

6. The method of claim 1, further comprising:

generating, based on the indication of the document editing pipeline, a plurality of spectrum slider elements for display on the client device;

generating a preview of the document modification by modifying a composition attribute of the digital document using the generative model based on receiving an interaction with a spectrum slider element of the plurality of spectrum slider elements; and applying the document modification to the digital document based on receiving a confirmation of the preview from the client device.

7. The method of claim 1, further comprising:

generating, for display on the client device based on receiving an indication selecting a tone modification pipeline from the plurality of pre-configured document editing pipelines, a plurality of tone slider elements selectable to modify respective tone attributes of the digital document;

determining, based on receiving an interaction with a tone slider element of the plurality of tone slider elements, a tone modification prompt for modifying a tone the digital document; and generating, utilizing the generative model to process the tone modification prompt, the document modification according to the tone modification prompt.

8. The method of claim 1, further comprising:

generating, based on receiving an interaction with a quote extraction pipeline of the plurality of pre-configured document editing pipelines, a quote extraction prompt instructing the generative model to extract quotes from content items stored at the content management system; and extracting a quote from a content item stored at the content management system by using the generative model to process the quote extraction prompt.

9. The method of claim 1, further comprising:

generating, based on receiving an interaction with a review simulation pipeline of the plurality of pre-configured document editing pipelines, a document review prompt instructing the generative model to review the digital document based on historical interactions of a user account within the content management system; and generating a review notification for display within the digital document by using the generative model to process the document review prompt.

10. The method of claim 1, wherein generating the document modification comprises generating, using the generative model, a completed version of the digital document based on receiving an interaction with an autonomous completion pipeline of the plurality of pre-configured document editing pipelines.

11. A system comprising:

at least one processor; and at least one non-transitory computer-readable storage medium storing instructions that, when executed by the at least one processor, cause the system to:

instantiate, based on an indication from a client device associated with a user account of a content management system, a generative document editor comprising a plurality of pre-configured document editing pipelines and a freeform document editing pipeline each executed by a generative model interacting with respective document modification tools;

receive, from the client device, an indication of a document editing pipeline from among the plurality of pre-configured document editing pipelines and the freeform document editing pipeline to use in modifying a digital document;

based on receiving the indication of the document editing pipeline, determine a composition attribute of the digital document to modify;

generate, based on determining a composition attribute of the digital document to modify, a document modification for the digital document by:

processing digital content stored for the user account within the content management system to determine document modification preferences for the user account; and generating the document modification according to the document modification preferences for the user account by using the generative model to interface with a document modification tool corresponding to the document editing pipeline; and provide the document modification for display on the client device.

12. The system of claim 11, further comprising instructions that, when executed by the at least one processor, cause the system to receive the indication of the document editing pipeline by receiving a freeform document editing query that describes a modification to the digital document.

13. The system of claim 11, further comprising instructions that, when executed by the at least one processor, cause the system to:

determine, by the generative model, a composition attribute value for the composition attribute of the digital document; and provide, for display as part of a graphical user interface presenting the generative document editor, a composition attribute spectrum indicating the composition attribute value.

14. The system of claim 13, further comprising instructions that, when executed by the at least one processor, cause the system to:

generate, for display as part of the composition attribute spectrum of the generative document editor, a spectrum slider element slidable to adjust the composition attribute value along the composition attribute spectrum;

determine, based on receiving an interaction sliding the spectrum slider element, a modification prompt indicating a modified composition attribute value; and generate the document modification by using the generative model to process the modification prompt indicating the modified composition attribute value.

15. The system of claim 11, further comprising instructions that, when executed by the at least one processor, cause the system to:

generate, based on receiving an interaction with a quote extraction pipeline of the plurality of pre-configured document editing pipelines, a quote extraction prompt instructing the generative model to extract quotes from one or more webpages of a web browser; and extract a quote from a webpage of the one or more webpages by using generative model to process the quote extraction prompt.

16. A non-transitory computer-readable medium storing instructions that, when executed by at least one processor, cause a computing device to:

instantiate, based on an indication from a client device associated with a user account of a content management system, a generative document editor comprising a plurality of pre-configured document editing pipelines and a freeform document editing pipeline each executed by a generative model interacting with respective document modification tools;

receive, from the client device, an indication of a document editing pipeline from among the plurality of pre-configured document editing pipelines and the freeform document editing pipeline to use in modifying a digital document;

generate, based on the indication of the document editing pipeline, a document modification for the digital document by:

processing digital content stored for the user account within the content management system to determine document modification preferences for the user account; and generating the document modification according to the document modification preferences for the user account by using the generative model to interface with a document modification tool corresponding to the document editing pipeline and further using the generative model to interface with a content item repository to augment the document modification; and provide the document modification for display on the client device.

17. The non-transitory computer-readable medium of claim 16, further comprising instructions that, when executed by the at least one processor, cause the computing device to receive the indication of the document editing pipeline by receiving a freeform document editing query that describes a modification to the digital document.

18. The non-transitory computer-readable medium of claim 16, further comprising instructions that, when executed by the at least one processor, cause the computing device to:

determine, by the generative model, a composition attribute value for a composition attribute of the digital document according to data from the content item repository; and provide, for display as part of a graphical user interface presenting the generative document editor, a composition attribute spectrum indicating the composition attribute value.

19. The non-transitory computer-readable medium of claim 18, further comprising instructions that, when executed by the at least one processor, cause the computing device to:

generate, for display as part of the composition attribute spectrum of the generative document editor, a spectrum slider element slidable to adjust the composition attribute value along the composition attribute spectrum;

determine, based on receiving an interaction sliding the spectrum slider element, a modification prompt indicating a modified composition attribute value; and generate the document modification by using the generative model to process the modification prompt indicating the modified composition attribute value.

20. The non-transitory computer-readable medium of claim 16, further comprising instructions that, when executed by the at least one processor, cause the computing device to:

generate, based on receiving an interaction with a review simulation pipeline of the plurality of pre-configured document editing pipelines, a document review prompt instructing the generative model to review the digital document based on historical interactions of a user account within the content management system; and generate a review notification for display within the digital document by using the generative model to process the document review prompt.

* * * * *